United States Patent
Yau

(10) Patent No.: US 10,219,135 B1
(45) Date of Patent: Feb. 26, 2019

(54) NEAR FIELD COMMUNICATION (NFC) ENHANCED COMPUTING SYSTEMS

(71) Applicant: American Megatrends, Inc., Norcross, GA (US)

(72) Inventor: Kai Yau, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 15/462,332

(22) Filed: Mar. 17, 2017

(51) Int. Cl.
H04B 5/00 (2006.01)
H04W 4/80 (2018.01)
H04W 12/06 (2009.01)

(52) U.S. Cl.
CPC ............ *H04W 4/80* (2018.02); *H04B 5/0031* (2013.01); *H04W 12/06* (2013.01)

(58) Field of Classification Search
CPC ..... H04W 4/008; H04W 12/06; H04B 5/0031
See application file for complete search history.

(56) References Cited

U.S. PATENT DOCUMENTS

| 6,525,648 B1 * | 2/2003 | Kubler | G06K 7/0008 340/10.33 |
| 8,180,291 B2 * | 5/2012 | Burr | H04W 52/0225 455/343.2 |
| 2006/0029412 A1 * | 2/2006 | Kato | G03G 15/5004 399/80 |
| 2007/0135078 A1 * | 6/2007 | Ljung | H04B 5/0037 455/343.1 |
| 2008/0090520 A1 * | 4/2008 | Camp | H04B 5/00 455/41.2 |
| 2008/0197193 A1 * | 8/2008 | Overhultz | G06Q 10/02 235/383 |
| 2014/0084060 A1 * | 3/2014 | Jain | G06Q 10/087 235/385 |
| 2014/0139323 A1 * | 5/2014 | Choo | G06K 19/073 340/10.51 |

* cited by examiner

Primary Examiner — Nguyen T Vo
(74) Attorney, Agent, or Firm — Newport IP, LLC Shigeta | Hope

(57) ABSTRACT

Technologies are disclosed herein for utilizing near field communication ("NFC") to improve the security, performance, and configuration of computing systems. In particular, NFC can be utilized to power an NFC-equipped server computer on or off, to log directly into an operating system executing on the NFC-equipped server computer, to stream firmware debugging data from an NFC-equipped server computer to an NFC-equipped mobile device, to initiate the update or recovery of firmware, to provide hardware inventory data, or to pair hardware devices. Firmware debugging data can also be streamed from a firmware to an NFC-equipped mobile device. NFC can also be utilized to disable functionality provided by a mobile device while the device is in motion, such as when a user of the mobile device is operating a motor vehicle.

12 Claims, 15 Drawing Sheets

NEAR FIELD COMMUNICATION (NFC) ENHANCED COMPUTING SYSTEMS

BACKGROUND

Server computers are commonly configured without any type of video display device. Because these configurations do not have a display, they are sometimes referred to as being "headless." In headless configurations, it can be difficult to manage the security, performance, and configuration of server computers. As a result, headless server computers might be less secure, operate less performantly, or be more difficult to configure than non-headless configurations. This can result in the inefficient utilization of computing resources.

Other types of computing devices that are equipped with video displays, such as wireless mobile phones, can present safety issues by virtue of the availability of their displays in certain scenarios. For example, a user might become distracted by the display of a wireless mobile device while driving a motor vehicle. This can have serious consequences both for the driver and for other drivers in the vicinity.

It is with respect to these and other considerations that the disclosure made herein is presented.

SUMMARY

The technologies disclosed herein provide functionality for utilizing near field communication ("NEC") to improve the security, performance, configuration, and potentially safety, of various types of computing systems. For example, through an implementation of the disclosed technologies, NFC can be utilized to enable an authorized user to power on an NFC-equipped server computer, thereby improving the security of the NFC-equipped server computer. In particular, a setup program provided by a firmware executing on the server computer or a setup program provided by a firmware executing on an embedded controller ("EC") in the server computer can be utilized to define credentials for users that are authorized to power on the server computer. The credentials can be stored in a non-volatile random access memory ("NVRAM") or another type of non-volatile memory in the server computer or in another location.

An NFC reader in the server computer can read credentials from an NFC card or an NFC-equipped mobile device. The credentials can be provided to the EC, which can compare the received credentials to the credentials previously defined and stored in the NVRAM to determine if the credentials read from the NFC reader are permitted to power on the server computer. If so, the EC can provide a power on signal to a power controller in the server computer in order to power on the server computer. A similar mechanism can be utilized to securely power off the server computer utilizing NFC. This mechanism can be utilized to improve the security of an NFC-equipped server computer by enabling only authorized users to power on or power off the server computer. In some configurations the server computer is not equipped with a traditional external power switch.

In another configuration, NFC can be utilized to log directly into an operating system ("OS") executing on an NFC-equipped server computer. An NFC reader can receive credentials for logging a user into an OS executing on the NFC-equipped server computer. The NFC reader can provide the credentials to a firmware executing on the NFC-equipped server computer. The firmware, in turn, can provide the credentials to a driver executing on the OS. The driver can utilize the credentials to log a user into the OS. Other types of user input (e.g. keyboard input) can also be utilized in conjunction with the credentials to log the user into the OS.

In another configuration, NFC can be utilized to stream firmware debugging data from an NFC-equipped server computer to an NFC-equipped mobile device. In particular, a firmware executing on an NFC-equipped server computer can collect firmware debugging data. The firmware debugging data can include, but is not limited to, system health information, checkpoints, and/or debugging logs. An NFC connection can be established between an NFC reader in the NFC-equipped server computer and an NFC-equipped mobile device. The firmware debugging data can then be streamed from the NFC-equipped server computer to the NFC-equipped mobile device. An application executing on the NFC-equipped mobile device can be utilized to specify the type of firmware debugging data that is to be streamed to the NFC-equipped mobile device. The firmware debugging data can be utilized to debug the execution of the firmware, thereby making the firmware execute more efficiently, more securely, and less error prone.

In another configuration, NFC can be utilized to initiate a firmware update or recovery for a NFC-equipped server computer. In particular, an NFC card or NFC-equipped mobile device can be utilized to store an NFC tag that includes data indicating that a firmware update or recovery is to be performed at an NFC-equipped server computer. During the booting of the NFC-equipped server computer, an NFC reader can be utilized to read the NFC tag from the NFC card or NFC-equipped mobile device. If the NFC tag indicates that a firmware recovery or update is to be performed, an update application stored on an external mass storage device can be executed. The update application is configured to update or recover the firmware of the NFC-equipped server computer from a firmware image stored on the external mass storage device or, potentially, on the NFC card or an NFC-equipped mobile device. If data cannot be read from an NFC card or an NFC-equipped mobile device indicating that a firmware update or recovery is to be performed, the update application will not be executed.

In another configuration, NFC can be utilized to obtain hardware inventory data for an NFC-equipped server computer. The hardware inventory data can include data that describes various hardware components installed in the NFC-equipped server computer. For example, and without limitation, the hardware inventory data can describe the amount of random access memory ("RAM"), the type of central processing unit ("CPU"), and/or the type of graphics cards or other add-in cards installed in the server computer. A firmware executing in the NFC-equipped server computer can collect the hardware inventory data. For example, the firmware might collect the hardware inventory data from a System Management BIOS ("SMBIOS") table. The firmware can then utilize an NFC reader in the server computer to store the hardware inventory data on an NFC card. The NFC card can be affixed to a case of the NFC-equipped server computer. An NFC-equipped mobile device can then be utilized to read the hardware inventory data from the NFC card.

In another configuration, an NFC-equipped computer can utilize an NFC reader to read wireless configuration data from a NFC card in a peripheral device. The wireless configuration data includes data for configuring the NFC-equipped computer for wireless communication with the peripheral device. For example, and without limitation, the wireless configuration data can include data for configuring communication between the computer and the peripheral device over BLUETOOTH or WI-FI. The NFC-equipped computer can utilize the wireless configuration data to establish a wireless data connection with the peripheral device.

In another configuration, NFC can be utilized to disable functionality provided by NFC-equipped mobile device, such as a wireless mobile telephone, while the device is in motion, such as when a user of the mobile device is operating a motor vehicle. In order to provide this functionality, a pad is provided that has an embedded NFC card storing an NFC tag in its secure element. The pad can be made of rubber, fabric, or another material. Preferably, the material will enable a mobile device to be placed on the pad and not move while a motor vehicle containing the pad is in motion. The pad might have straps or other elements for holding a mobile device in proximity to the pad.

The pad can be created in a size suitable for placing the pad on the dashboard of a motor vehicle and for allowing a mobile device to be placed upon its surface. For example, the pad can have dimensions slightly larger than a typical wireless mobile telephone. The pad can also be affixed to the dashboard or other location within a motor vehicle through the use of adhesive, VELCRO, or another mechanism. The pad does not need to receive power.

When an NFC-equipped mobile device, such as a wireless mobile telephone, is placed on the pad, the mobile device can read the NFC tag from the NFC card in the pad. If the mobile phone is able to read the NFC tag, one or more functions of the mobile device can be disabled. For example, a video display and/or user input device (e.g. keyboard, touchscreen, or buttons) of the mobile device can be disabled. Other features of the mobile device may remain enabled, such as the ability to make wireless hands-free phone calls via BLUETOOTH. In this manner, certain features of the mobile device can be disabled while the mobile device is located on the pad.

Additionally, if the NFC tag can be read from the NFC card in the pad, the mobile device can transmit a message to a remote server indicating that the mobile device is located on the pad. In response to receiving such a message, the server can transmit a message to a wireless starter interrupt device in the motor vehicle to enable operation of the motor vehicle. The motor vehicle cannot be started until the starter interrupt device receives such a message from the server computer. In some configurations, the mobile device can transmit a message to the wireless starter interrupt device in the motor vehicle to enable operation of the motor vehicle.

A determination can periodically be made as to whether the mobile device can still read the NFC tag in the secure element of the NFC card in the pad. If the mobile device can continue to read the NFC tag, this means that the mobile device is still on the pad and the previously disabled functions should remain disabled. If the mobile device is unable to read the NFC tag, a determination can be made as to whether the mobile device is in motion (e.g. within a moving automobile).

If the mobile device is unable to read the NFC tag and the mobile device is in motion (e.g. in a moving motor vehicle), an audible or visual indicator can be provided on the mobile device indicating that the mobile device should be placed on the pad. In a similar fashion, if the mobile device is unable to read the NFC tag and the mobile device is in motion (e.g. in a moving motor vehicle), the mobile device can send a message to the server computer indicating that the mobile device is in motion. In turn, the server computer can transmit a message to the wireless starter interrupt device to provide an audible indicator that the mobile device should be placed back on the pad.

Additionally, if the mobile device is unable to read the NFC tag and the mobile device is in motion (e.g. in a moving motor vehicle), the mobile device can send a message to the server computer indicating that the mobile device is in motion. In turn, the server computer can transmit a message to the wireless starter interrupt device to disable one or more functions of the motor vehicle. For example, the server computer might instruct the wireless starter interrupt device to turn the vehicle off or disable the radio in the vehicle. If the device is not located on the pad and the mobile device is not in motion for a threshold period of time, this means that the motor vehicle has stopped moving and the previously disabled functions of the mobile device can be re-enabled. Through the use of this mechanism, mobile devices can be more safely used in automobiles and, additionally, save battery power while the various functions of the mobile device are disabled.

It is to be appreciated that technical benefits other than those specifically mentioned herein can be realized through an implementation of the disclosed technologies. It is to be further appreciated that the subject matter disclosed herein can be implemented as a computer-controlled apparatus, a computer-implemented method, a computing system, or as an article of manufacture such as a non-transitory computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
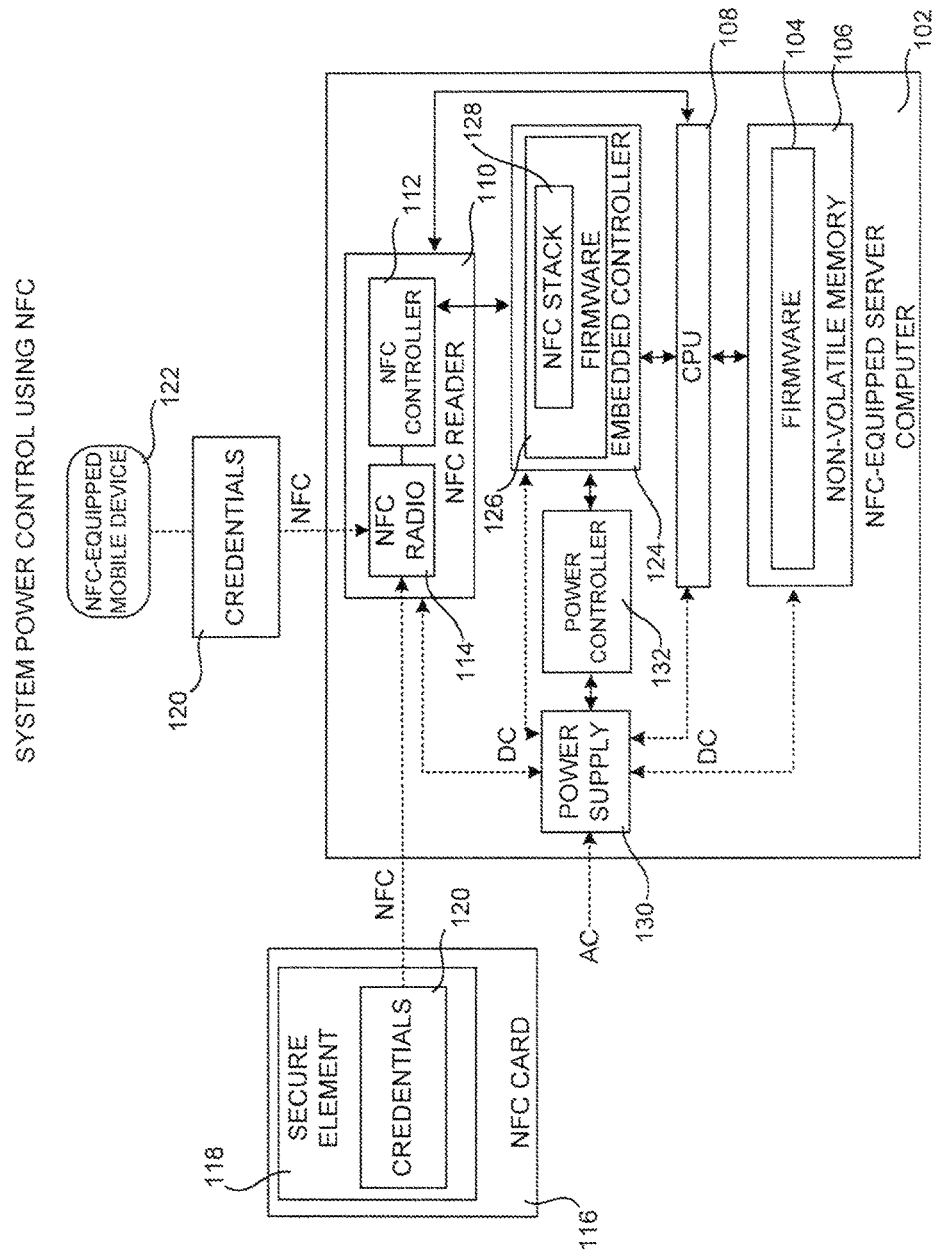
FIG. 1 is a block diagram showing aspects of a server computer disclosed herein that can be powered on or off utilizing NFC.

The following detailed description is directed to technologies for utilizing NFC to improve the security, performance, configuration, and potentially other aspects of an NFC-equipped server computer. While the subject matter described herein is presented in the general context of program modules that execute in conjunction with the execution of an operating system and application programs on one or more computer systems, those skilled in the art will recognize that other implementations can be performed in combination with other types of program modules.

Generally, program modules include routines, programs, components, data structures, and other types of structures that perform particular tasks or implement particular abstract data types. Moreover, those skilled in the art will appreciate that the subject matter described herein can be practiced with other computer system configurations, including handheld devices, multiprocessor systems, microprocessor-based or programmable consumer electronics, minicomputers, mainframe computers, and the like.

The subject matter described herein can be practiced in a distributed computing environment where tasks are performed by remote processing devices that are linked through a communications network, and wherein program modules can be located in both local and remote memory storage devices. It should be appreciated, however, that the implementations described herein can also be utilized in conjunction with stand-alone computer systems and other types of computing devices. It should also be appreciated that the embodiments presented herein can be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several FIGS., aspects of a computing system and methodology for NFC-enhanced security, configuration, and performance of a server computer will be described.

FIG. 1 is a block diagram showing aspects of an NFC-equipped server computer 102 that can be powered on (or off) by authorized users utilizing NFC. As known to those skilled in the art, NFC is a set of technologies that permit devices to communicate over a short distance (e.g. 10 cm or less) by bringing them into close proximity with one another. NFC devices typically operate in one or more of three modes: NFC initiator; NFC target; or NFC peer-to-peer mode. An NFC initiator actively generates a radio frequency ("RF") field that can power a passive NFC target (an unpowered chip), commonly referred to as a "tag." NFC peer-to-peer communication differs in application as both devices (i.e. peers) are powered. NFC tags typically contain data (e.g. between 96 and 4,096 bytes of memory). Additional details regarding the specific implementation of NFC technologies can be obtained from the NFC Forum.

It is to be appreciated that the architecture of the NFC-equipped server computer 102 (which might be referred to as the "server 102") shown in FIG. 1 has been simplified for ease of discussion. It is also to be appreciated that the configurations disclosed herein with reference to the NFC-equipped server computer 102 can be implemented with regard to other types of computing systems including, but not limited to, desktop computers, laptop computers, and the like. Additional details regarding a computer architecture suitable for implementing a computer for implementing the various technologies disclosed herein can be found below with regard to FIG. 15.

In one configuration, the server computer 102 includes an NFC reader 110 and appropriate software (e.g. drivers, etc.) for utilizing the NFC reader 110. As shown in FIG. 1, the NFC reader 110 is configured with an NFC controller 112 and an NFC radio 114. The NFC reader 110 might also utilize other components not explicitly shown in FIG. 1. The NFC reader 110 allows the NFC-equipped server computer 102 to read NFC tags from other devices, such as the NFC card 116 and/or the NFC-equipped mobile device 122 when those devices are placed in proximity to the NFC reader 110. In this regard, it is to be appreciated that although the NFC reader 110 is referred to herein as a "reader", this device can also be utilized to write data to an NFC card or NFC-equipped mobile device 122 when those devices are placed in proximity to the NFC reader 110 in some configurations.

As is also shown in FIG. 1, the NFC-equipped server computer 102 is also equipped with a central processing unit ("CPU") 108 and a non-volatile memory 106 storing a firmware 104. As known to those skilled in the art, the firmware 104 provides functionality for initializing memory, recognizing and controlling various computing devices within the server 102 or connected to the server 102, and/or performing other functions when the server 102 is powered on. Such a firmware 104 is typically stored on a non-volatile memory 106 within the server 102. The firmware 104 might be a basic input/output system ("BIOS") firmware, a Unified Extensible Firmware Interface ("EFI") Specification-compliant firmware, or another type of computer system firmware.

The firmware 104 can also provide a setup program (not shown in FIG. 1). The firmware-provided setup program can provide an interface through which a user of the NFC-equipped server computer 102 can specify parameters to customize the operation of the NFC-equipped server computer 102. For example, and without limitation, the firmware-provided setup menu might provide functionality for defining parameters relating to CPUs, memory, mass storage devices, security, system time and/or date, language, power, booting and, potentially, other types of parameters not specifically mentioned herein. As discussed in greater detail below, the firmware-provided setup program can also be utilized to define users that are authorized to power the server computer 102 on or off.

The firmware 104 might also provide the ability to password protect the NFC-equipped server computer 102. For example, and without limitation, a user may be required to provide a password to the NFC-equipped server computer 102 to access the setup menu described above or to boot the NFC-equipped server computer 102. An administrator password can be defined in some implementations that permits a user to access the full range of parameters available through the setup menu. A non-administrator "user" password might also be defined that provides access to a more limited set of parameters available through the setup menu.

The server 102 can also be configured to utilize the NFC reader 110 in order to restrict the ability to power the NFC-equipped server computer 102 on or off to certain authorized users. In order to enable this functionality, the server computer 102 can also be equipped with an embedded controller ("EC") 124. The EC 124 can include its own CPU and memory, such as a non-volatile random access memory ("NVRAM"). The NVRAM can store a firmware 126 for controlling the operation of the EC 124 along with an NFC stack 128 for implementing NFC functionality within the firmware 126.

As illustrated in FIG. 1, the EC 124 can interface with a power controller 132. In turn, the power controller 132 can be connected to a control signal of a power supply 130. The power supply 130 supplies direct current ("DC") power to the various components of the server computer 102 including, but not limited to, the NFC reader 110, the EC 124, the power controller 132, the CPU 108, and the non-volatile memory 106. The EC 124 and the NCF reader 110 can operate in a "standby" mode of operation, wherein these components are powered on while other components in the server computer 102 are powered off.

As discussed briefly above, a setup program (not shown in FIG. 1) provided by the firmware 104 executing on the server computer 102 or a setup program (not shown in FIG. 1) provided by the firmware 126 executing on the EC in the server computer 102 can be utilized to define credentials for users that are authorized to power on the server computer 102. The user-defined credentials can be stored in the non-volatile memory 106 the server computer 102, in a non-volatile memory in the EC 124, or in another location.

As also discussed briefly above, the NFC reader 110 can read an NFC tag containing credentials 120 from a secure element 118 of an NFC card 116 when the NFC card 116 is placed in proximity to the NFC reader 110. In a similar fashion, the NFC reader 110 can read credentials 120 from an NFC-equipped mobile device 122, such as a smartphone or a tablet computing device. The NFC reader 110 can also read credentials 120 from other NFC-equipped components in a similar fashion.

When the NFC reader 110 reads the credentials 120, the NFC reader 110 can provide the credentials to the EC 124. In turn, the EC 124 can receive the credentials 120 and compare the received credentials 120 to the credentials previously defined and stored in the non-volatile memory of the EC 124 or the server computer 102 to determine if the credentials 120 read by the NFC reader 110 indicate a right to power on the server computer 102. If the read credentials 120 indicate a right to power on the server computer 102, the EC 124 can provide a power on signal to the power controller 132 in the server computer 102.

In turn, the power controller 132 can provide a power on signal to the power supply 130, thereby turning on power to the various components (e.g. CPU 108, non-volatile memory 106, motherboard, disk devices, etc.) of the server computer 102. A similar mechanism can be utilized to power off the server computer 102 utilizing credentials 120 received via NFC. This mechanism can be utilized to improve the security of the NFC-equipped server 102 computer by enabling only authorized users to power on or power off the server computer 102. In various configurations, the server computer 102 does not have an external power button in order to further enhance the security of the server computer 102.

Figure 2:
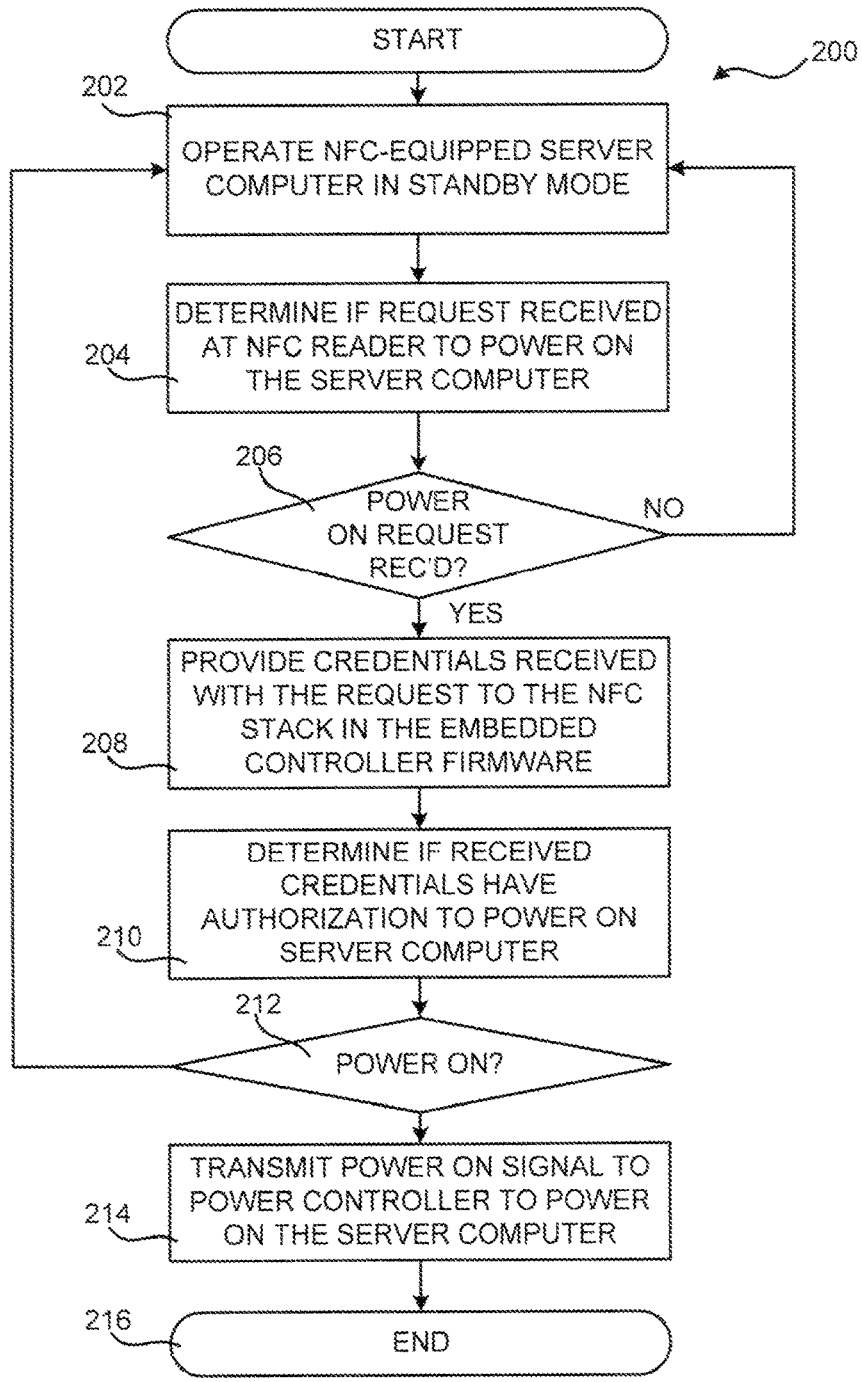
FIG. 2 is a flow diagram illustrating aspects of one method disclosed herein for powering on a server computer utilizing NFC, utilizing the mechanism illustrated in FIG. 1.

FIG. 2 is a flow diagram illustrating aspects of one routine 200 disclosed herein for powering an NFC-equipped server computer on or off utilizing the mechanism illustrated in FIG. 1 and discussed above. It should be appreciated that the logical operations described herein with regard to FIG. 2 and the other FIGS. are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules can be implemented in software, in firmware, in special purpose digital logic, and any combination.

The routine 200 begins at operation 202, where the server computer 102 is operated in a standby mode of operation. In this mode of operation, the EC 124, the power controller 132, and the NFC reader 110 are powered on. Other components of the server computer 102, such as the CPU 108 and non-volatile memory 106 can be powered off. From operation 202, the routine 200 proceeds to operation 204.

At operation 204, the NFC reader 110 determines whether a request has been received to power on the server computer 102. Such a request can be initiated by placing the NFC card 116 or the NFC-equipped mobile device 122 in proximity to the NFC reader 110. The NFC reader 110 can then read the credentials 120 from the NFC card 116 or the NFC-equipped mobile device 122.

If such a request has been received, the routine 200 proceeds from operation 206 to operation 208. If no such request has been received, the routine 200 proceeds back to operation 202, where the server computer 102 continues to operate in standby mode.

At operation 208, the NFC reader 110 provides the credentials 120 to the NFC stack 128 executing in the firmware 126 of the EC 124. The firmware 126 can then determine if the credentials 120 indicate a right to power on the server computer 102 at operation 210. In particular, the credentials 120 can be compared to the credentials previously defined using a setup program provided by the firmware 126 or the firmware 104 and stored in the non-volatile memory 106 or the non-volatile memory of the EC 124.

If the received credentials 120 do not indicate a right to power on the server computer 102 at operation 212, the routine 200 proceeds back to operation 202, where the server computer 102 can continue to operate in the standby mode of operation. If, however, the received credentials 120 do indicate a right to power on the server computer, the routine 200 proceeds to operation 214. At operation 214, the EC 124 provides a power on signal to the power controller 132. In turn, the power controller 132 causes the power supply 130 to provide power to all of the components of the server computer 102 (e.g. the CPU 108, motherboard, non-volatile RAM 106, disks, etc.). The routine 200 then proceeds from operation 214 to operation 216, where it ends.

Figure 3:
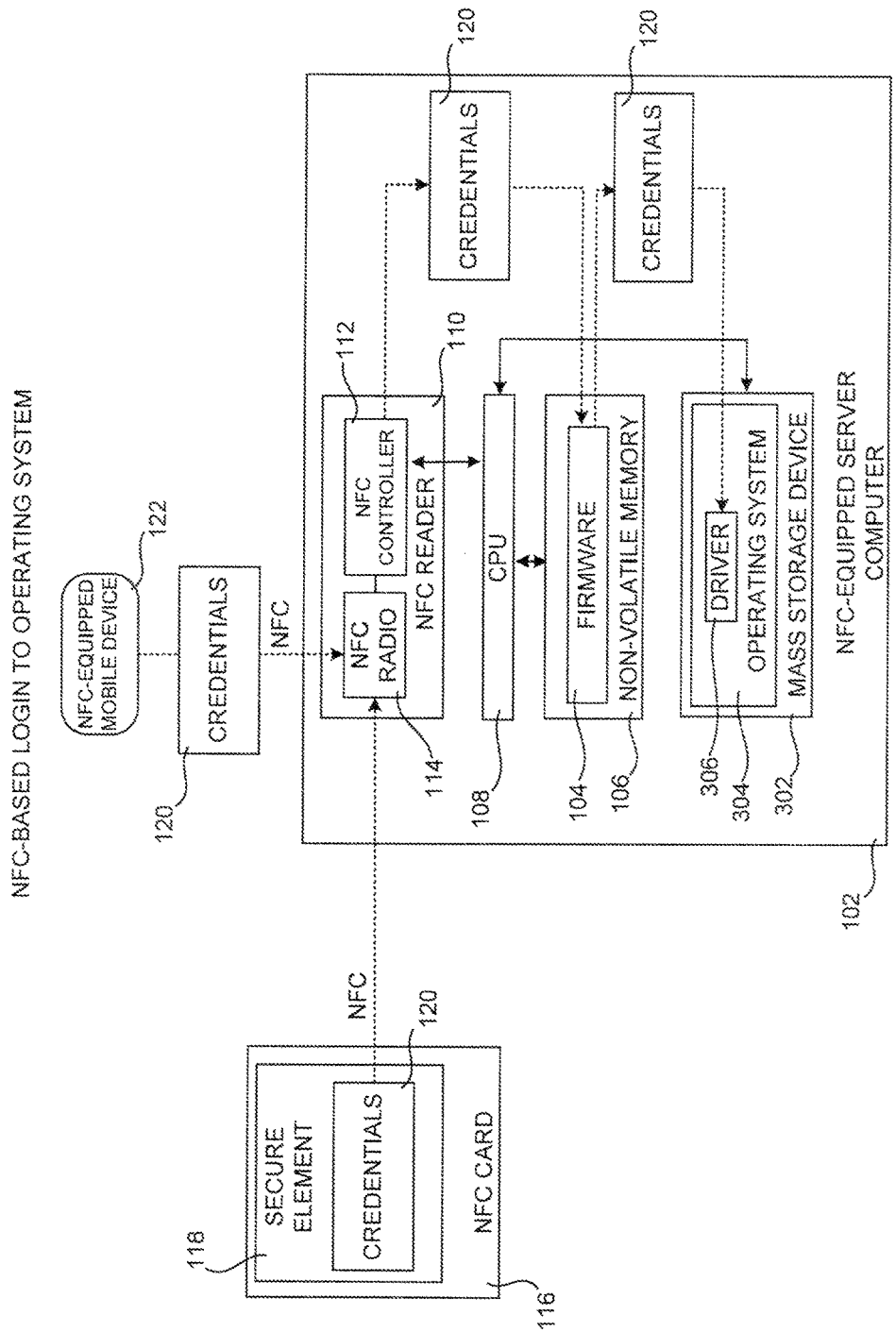
FIG. 3 is a block diagram showing aspects of a system disclosed herein for logging into an operating system utilizing NFC, according to one configuration.

FIG. 3 is a block diagram showing aspects of a system disclosed herein for logging into an operating system utilizing NFC, according to one configuration. In the configuration shown in FIG. 3, the server computer 102 is equipped with a mass storage device 302, such as a hard disk drive ("HDD") or a solid state drive ("SSD"). As also shown in FIG. 3, the mass storage device 302 can store an OS 304 that can be executed on the CPU 108. For example, and without limitation, the OS 304 can be the WINDOWS operating system from MICROSOFT CORPORATION. Other types of operating systems can also be utilized. A driver 306 is also provided that can be executed on the OS 304.

In order to log a user into the OS without user intervention, the user can present an NFC card 116 or an NFC-equipped mobile device 122 that includes credentials 120 for logging the user into the OS. The NFC reader 110 can receive the credentials for logging the user into the OS 304 executing on the NFC-equipped server computer 102.

As illustrated in FIG. 3, the NFC reader 110 can provide the received credentials 120 to a firmware 104 executing on the NFC-equipped server computer 102. In one configuration, the firmware 104 is a Unified Extensible Firmware Interface ("UEFI") Specification—compliant firmware. A UEFI protocol (not shown in FIG. 1) executing within the firmware 104 can be configured to receive the credentials 120 from the NFC reader 110. Other types of firmware and firmware components can receive the credentials 120 in other configurations.

The firmware 104, in turn, can provide the credentials 120 to the driver 306 executing on the OS 304. For example, and without limitation, a UEFI protocol can receive the credentials 120 from the NFC reader 110 during or after a power on self-test ("POST") of the server computer 102. Once the operating system 304 has been loaded, the UEFI protocol can provide the credentials 120 to the driver 306. The driver 306, in turn, can utilize the credentials to log a user (e.g. the user presenting the NFC card 116 or the NFC-equipped mobile device 122) into the OS 304. Other types of user input (e.g. keyboard input) can also be utilized in conjunction with the credentials 120 to log the user into the OS 304. Additional details regarding this process will be provided below with regard to FIG. 4.

Figure 4:
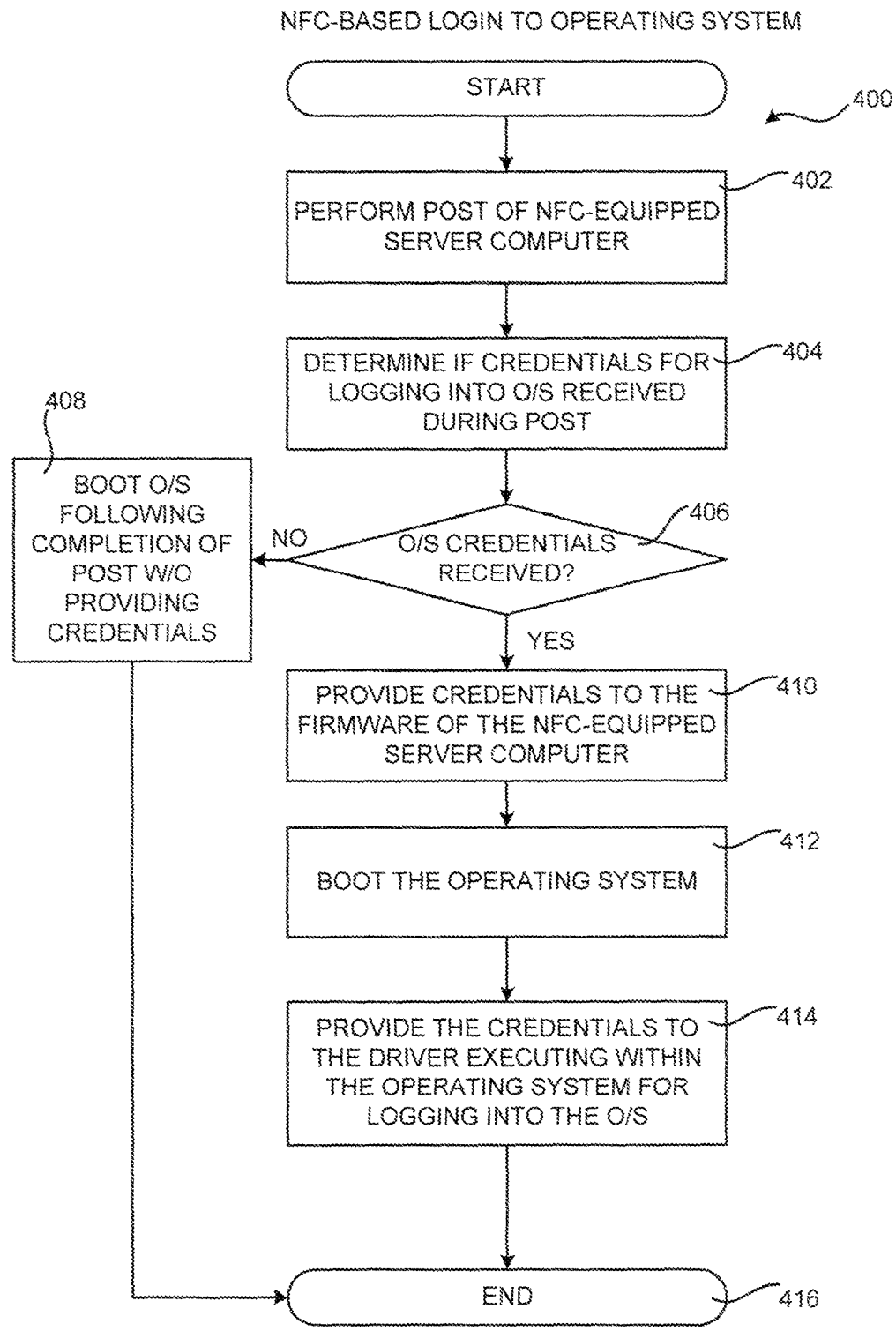
FIG. 4 is a flow diagram illustrating aspects of one method disclosed herein for logging into an operating system via NFC utilizing the mechanism illustrated in FIG. 3.

FIG. 4 is a flow diagram illustrating aspects of one routine 400 disclosed herein for logging a user into the operating system 304 via NFC utilizing the mechanism illustrated in FIG. 3. The routine 400 begins at operation 402, where a POST can be performed of the NFC-equipped server computer 102. During or immediately after the POST operation, the NFC reader 110 can determine if credentials 120 for logging a user into the OS 304 have been received from an NFC card 116 or an NFC-equipped mobile device 122. This occurs at operation 404.

If no credentials 120 have been received, the routine 400 proceeds from operation 406 to operation 408, where the OS 304 is booted, but no credentials are provided to the OS 304. A user can provide credentials 120 to the OS 304 in a conventional manner. If, however, credentials 120 have been received for logging a user into the OS, the routine 400 proceeds from operation 406 to operation 410.

At operation 410, the NFC reader 110 provides the credentials 120 to the firmware 104. As discussed above, in one configuration the firmware 104 is a UEFI Specification—compliant firmware. In this configuration, a UEFI protocol can receive the credentials 120.

From operation 410, the routine 400 proceeds to operation 412, where the server computer 102 boots the OS 304. Once the OS 304 has been booted, the driver 306 can be executed on the OS 304. The routine 400 then proceeds from operation 412 to operation 414, where the firmware 104 (e.g. the UEFI protocol) provides the credentials 120 to the driver 306 executing on the OS 304. The driver 306 can then provide the credentials to the OS 304 for use in logging a user into the OS 304.

As discussed above, keyboard user input (or another type of user input) can also be utilized in conjunction with the credentials 120 to log a user into the OS 304. In this configuration, the firmware 104 or the driver 306 can receive the user input and provide the user input and the credentials 120 to the OS 304 for use in logging the user into the OS 304. From operations 408 and 414, the routine 400 proceeds to operation 416, where it ends.

Figure 5:
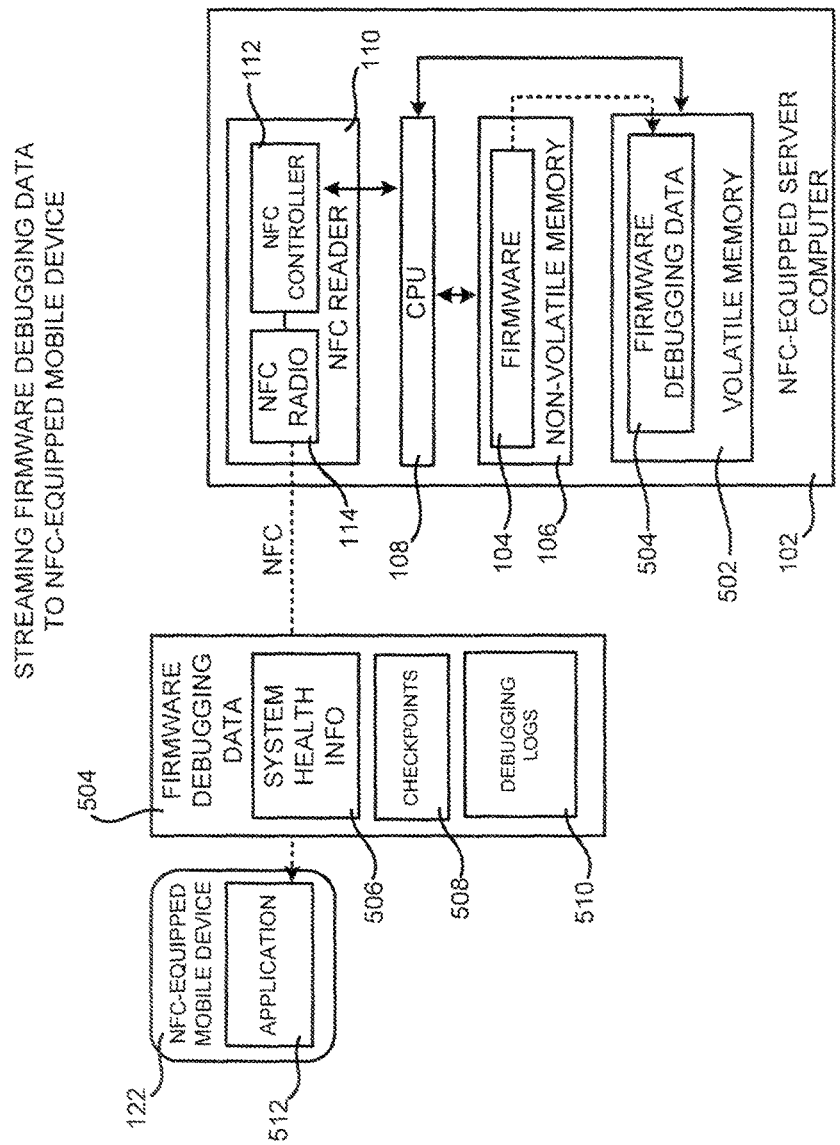
FIG. 5 is a block diagram showing aspects of a server computer disclosed herein that can stream firmware debugging data to an NFC-equipped mobile device via NFC.

FIG. 5 is a block diagram showing aspects of a server computer 102 disclosed herein that can stream firmware debugging data 504 to an NFC-equipped mobile device 122 via an NFC connection. As described briefly above, the server computer 102 can be configured with a firmware 104. The firmware 104 can include an NFC stack 128 (not shown in FIG. 5) in order to facilitate establishing NFC connections and communicating over the NFC connections. The firmware 104 can also provide functionality for generating firmware debugging data 504. The firmware 104 can store the firmware debugging data 504 in a volatile memory device 502, such as a random access memory ("RAM").

The firmware debugging data 504 includes any type of data that can be utilized to debug the operation of the firmware 104. For example, and without limitation, the firmware debugging data can include system health information 506. System health information 506 is any data that describes the operational status of the NFC-equipped server computer 102 including, but not limited to, system temperature, memory usage and failures, disk usage and failures, and network status. As described briefly above, an application 512 executing on the NFC-equipped mobile device 122 can be utilized in some configurations to specify the various types of firmware debugging data 504 that is to be streamed to the NFC-equipped mobile device 122.

The firmware debugging data 504 can also include data describing checkpoints 508. The checkpoints 508 include data describing a particular address at which the firmware 104 is executing. The checkpoints 508 might also include other data describing other aspects of the operation of the firmware 104 when executing at a particular memory address.

The firmware debugging data 504 can also include debugging logs 510. The debugging logs 510 are logs generated by the firmware 104 during execution. The debugging logs 510 can include data describing the operation of the server computer 102 and/or the firmware 104 that can be utilized to debug the operation of the firmware 104.

An NFC connection can be established between the NFC reader 110 in the NFC-equipped server computer 102 and the NFC-equipped mobile device 122. For example, and without limitation, an NFC peer-to-peer connection can be established between the NFC reader 110 in the NFC-equipped server computer 102 and the NFC-equipped mobile device 122. The firmware debugging data 504 can then be streamed from the NFC-equipped server computer 102 to the NFC-equipped mobile device 122 during execution of the firmware 104. The firmware debugging data 504 can be utilized to debug the operation of the firmware 104, thereby making the firmware 104 execute more efficiently, reduce errors, and, potentially, make the firmware 104 more secure.

Figure 6:
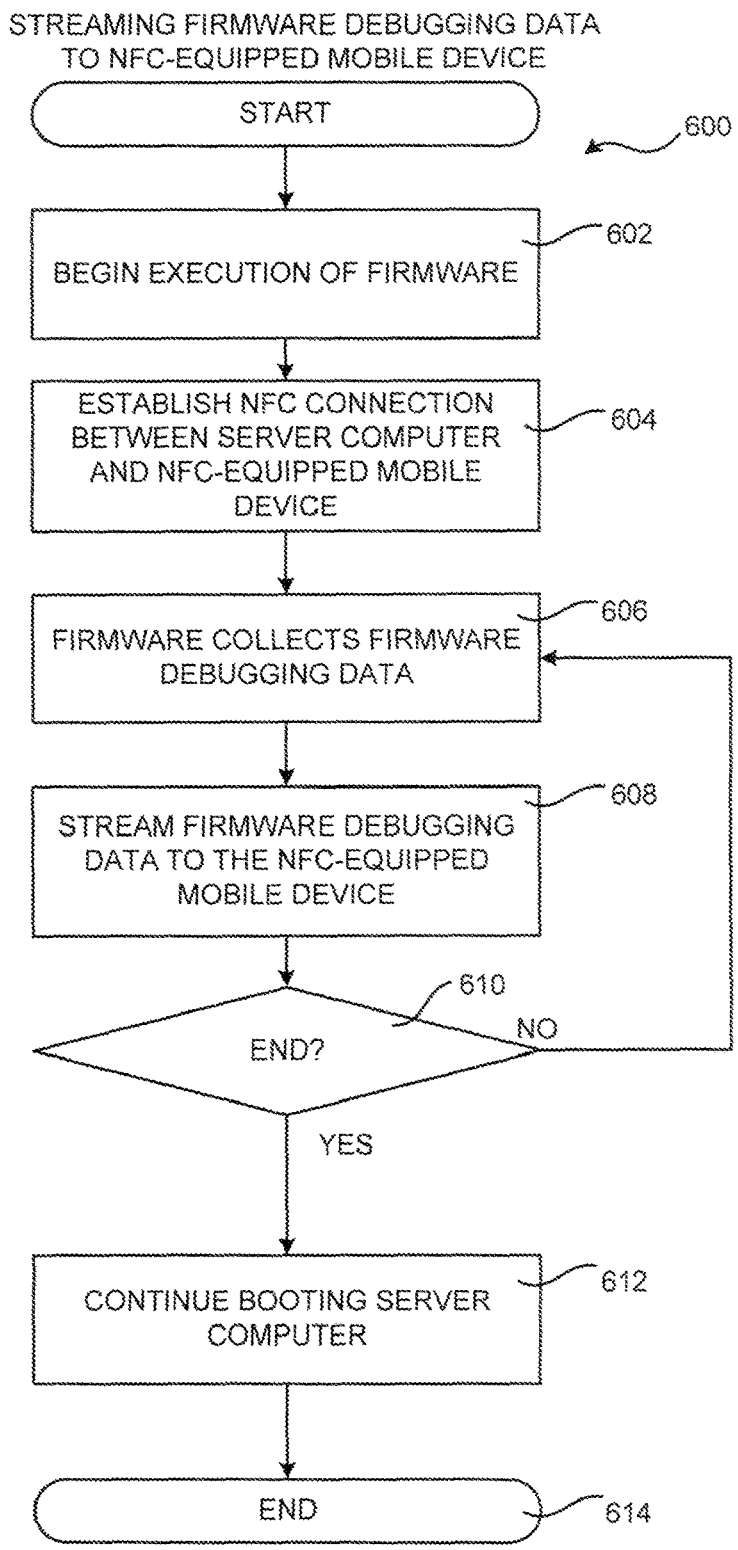
FIG. 6 is a flow diagram illustrating aspects of one method disclosed herein for streaming firmware debugging data to an NFC-equipped mobile device via NFC, utilizing the mechanism illustrated in FIG. 5.

FIG. 6 is a flow diagram illustrating aspects of one routine 600 disclosed herein for streaming firmware debugging data 504 to an NFC-equipped mobile device 122 via NFC, utilizing the mechanism illustrated in FIG. 5. The routine 600 begins at operation 602, where execution of the firmware 104 begins, such as during the boot-up of the server computer 102. From operation 602, the routine 600 proceeds to operation 604, where the firmware 104 causes an NFC connection to be established between the NFC reader 110 and the NFC-equipped mobile device 122. As discussed above, the NFC connection is an NFC peer-to-peer connection in some configurations.

From operation 604, the routine 600 proceeds to operation 606, where the firmware 104 collects or generates the firmware debugging data 504. As discussed above, the firmware debugging data 504 can include, but is not limited to, system health information 506, checkpoints 508, and/or debugging logs 510. The firmware debugging data 504 can be stored in the volatile memory 502.

The routine 600 then proceeds from operation 606 to operation 608, where the firmware 104 streams the firmware debugging data 504 to the NFC-equipped mobile device 122 via the NFC connection established at operation 604. The firmware 104 can continue streaming the firmware debugging data 504 to the NFC-equipped mobile device 122 until control of the server computer 102 is handed off to an OS, until a user requests to stop streaming, or until another time. When streaming is to end, the routine 600 proceeds from operation 610 to operation 612, where the server computer 102 can continue booting. For example, an OS can be booted on the server computer 102. The routine 600 then proceeds from operation 612 to operation 614, where it ends.

Figure 7:
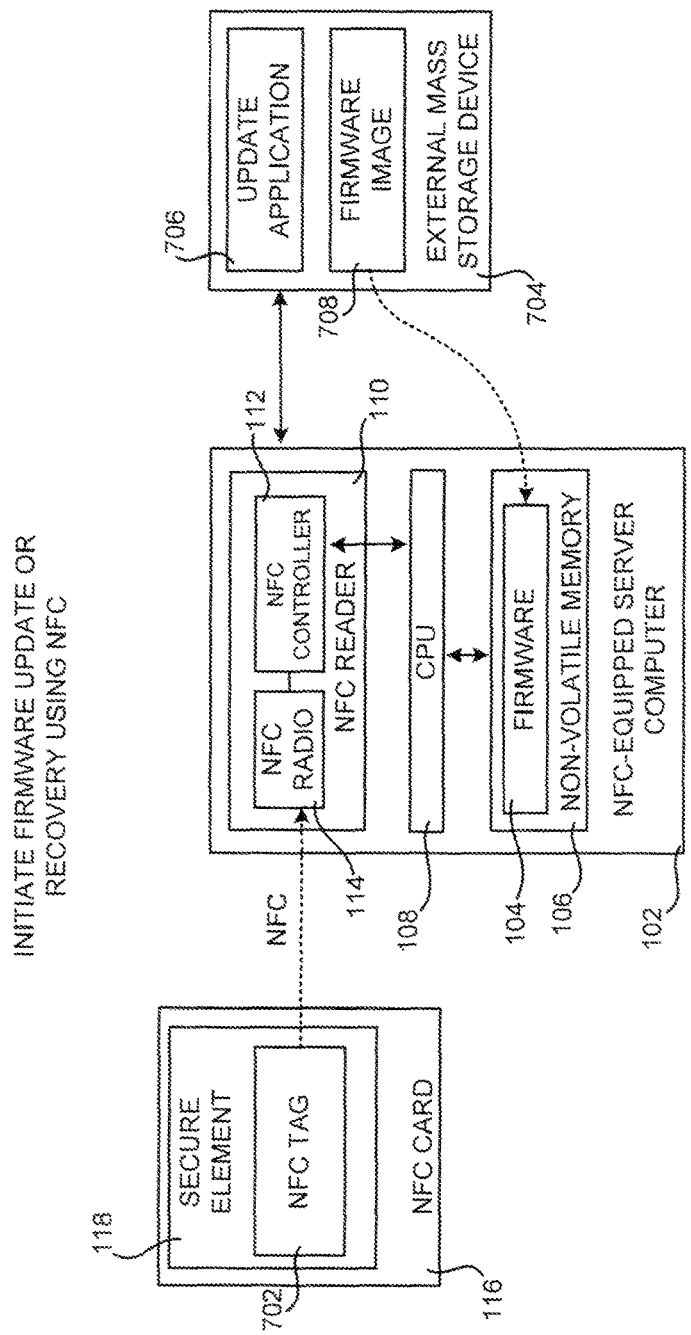
FIG. 7 is a block diagram showing aspects of a server computer disclosed herein that can utilize NFC to initiate an update or recovery of a firmware executing in the server computer, according to one configuration.

FIG. 7 is a block diagram showing aspects of a server computer 102 disclosed herein that can utilize NFC to initiate an update or recovery of a firmware 104 executing in the server computer 102, according to one configuration. As shown in FIG. 7, the server computer 102 can read an NFC tag 702 from an NFC card 116 or an NFC-equipped mobile device 122 during booting of the server computer 102. The NFC tag 702 can include data indicating whether a recovery or update of the firmware 104 of the server computer 102 is to be performed.

If the data stored in the NFC tag 702 indicates that a recovery or update of the firmware 104 is to be performed, an update application 706 stored on an external mass storage device 704 will be executed. In some configurations the server computer 102 is rebooted prior to execution of the update application 706. In these configurations, the server computer 102 can be booted from the external mass storage device 704.

The update application 706 is configured to update or recover the firmware 104 of the NFC-equipped server computer 102 from a firmware image 708 stored on the external mass storage device 704 or, potentially, on the NFC card 116 or an NFC-equipped mobile device. If an NFC tag 702 contains data indicating that a firmware update or recovery is to be performed on the firmware 104, the update application 706 will not be executed. Additional details regarding this process are provided below with regard to FIG. 8.

Figure 8:
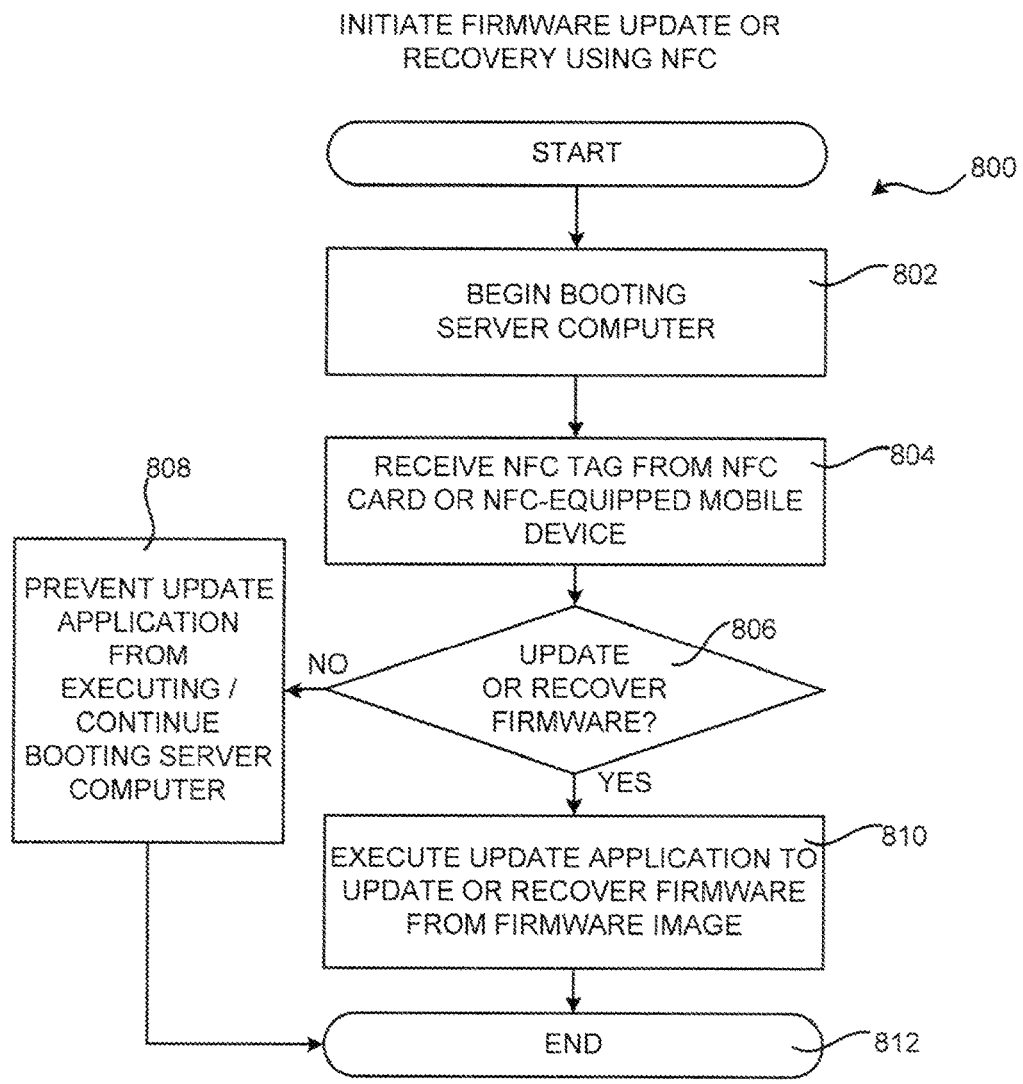
FIG. 8 is a flow diagram illustrating aspects of one method disclosed herein for initiating the update or recovery of a computer system firmware, utilizing the mechanism illustrated in FIG. 7.

FIG. 8 is a flow diagram illustrating aspects of one routine 800 disclosed herein for using NFC to initiate the update or recovery of a computer system firmware, utilizing the mechanism illustrated in FIG. 7. The routine 800 begins at operation 802, where booting of the server computer 102 is begun. Booting of the server computer 102 can include execution of the firmware 104.

From operation 802, the routine 800 proceeds to operation 804, where the firmware 104 utilizes the NFC reader 110 to read an NFC tag 702 from the NFC card 116 or from an NFC-equipped mobile device. From operation 804, the routine 800 proceeds to operation 806, where the firmware 104 determines whether data stored in the NFC tag 702 indicates that an update or recovery is to be performed of the firmware 104. If the data stored in the NFC tag 702 does not indicate that an update or recovery of the firmware 104 is to be performed, the routine 800 proceeds from operation 806 to operation 808 where the firmware 104 can prevent execution of the update application 706.

If, however, the data stored in the NFC tag 702 does indicate that an update or recovery of the firmware 104 is to be performed, the routine 800 proceeds from operation 806 to operation 810. At operation 810, the firmware 104 causes the update application 706 to be executed from the external mass storage device 704. As discussed above, the server computer 102 might be rebooted from the external mass storage device 704. Once the server computer 102 has been rebooted, the update application 706 can update or recover the firmware using the firmware image 708. This can include copying the firmware image 708 to the non-volatile memory 106 to replace the existing firmware 104. As also discussed above, the firmware image 708 can be stored on the external mass storage device 704, the NFC card 116, an NFC-equipped mobile device 122, or in another location accessible to the server computer 102. From operations 808 and 810, the routine 800 proceeds to operation 812 where it ends.

Figure 9:
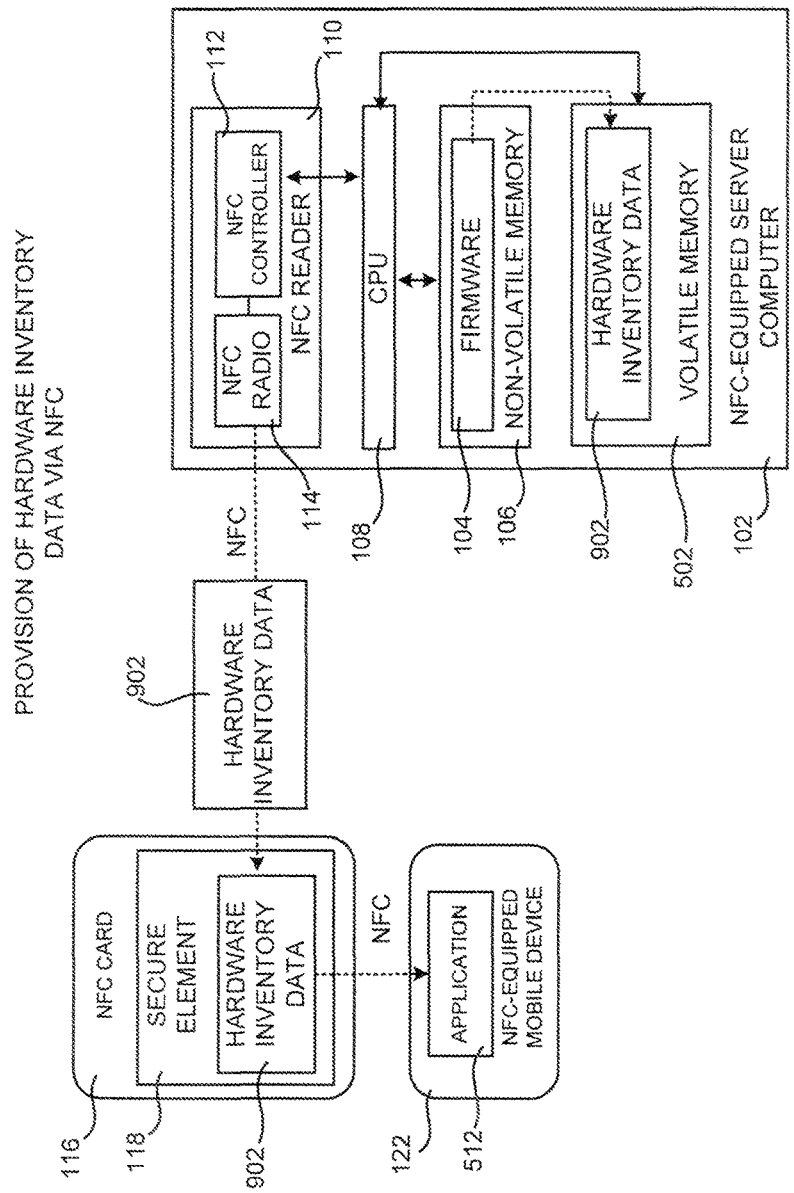
FIG. 9 is a block diagram showing aspects of a server computer disclosed herein that can utilize NFC to provide hardware inventory data that identifies hardware in the server computer, according to one configuration.

FIG. 9 is a block diagram showing aspects of a server computer 102 disclosed herein that can utilize NFC to provide hardware inventory data 902 that identifies hardware in the server computer 102, according to one configuration. The hardware inventory data 902 can include data that describes various hardware components installed in the NFC-equipped server computer 102. For example, and without limitation, the hardware inventory data 902 can describe the amount of RAM in the server computer 102, the type of CPU in the server computer 102, and/or the type of graphics cards or other add-in cards installed in the server computer 102. The hardware inventory data 902 can describe other aspects of other hardware components in the server computer 102 in other configurations.

The firmware 104 of the NFC-equipped server computer 102 can collect the hardware inventory data 902. For example, and without limitation, in one configuration the firmware 104 collects the hardware inventory data 902 from a SMBIOS table (not shown in FIG. 9). The firmware 104 can also collect the hardware inventory data 902 in other ways in other configurations, such as by taking an inventory of the hardware of the server computer 102.

Once the firmware 104 has collected the hardware inventory data 902, the firmware 104 can utilize an NFC reader 110 in the server computer 102 to store the hardware inventory data 902 on an NFC card 116. The hardware inventory data 902 can be collected and stored on the NFC card 116 in this manner on each boot of the server computer 102.

In one configuration, the NFC card 116 is affixed to a case of the NFC-equipped server computer 102. An application 512 executing on an NFC-equipped mobile device 122 can then be utilized to read the hardware inventory data 902 from the NFC card 116. The hardware inventory data 902 can then be utilized to ensure that only compatible components are installed in the server computer 102, such as during a repair of the server computer 102. The hardware inventory data 902 can be utilized in other ways in other configurations. Additional details regarding this mechanism will be provided below with regard to FIG. 10.

Figure 10:
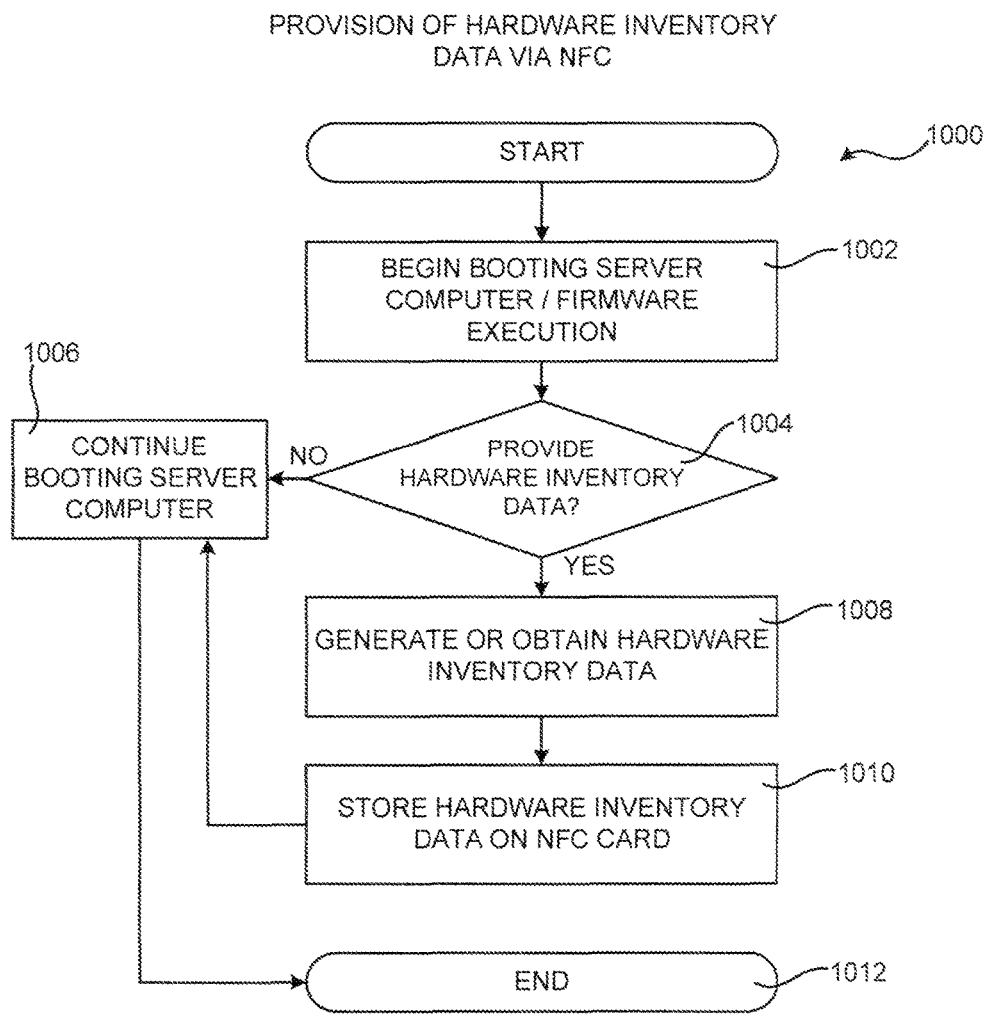
FIG. 10 is a flow diagram illustrating aspects of one method disclosed herein for providing hardware inventory data via NFC, utilizing the mechanism illustrated in FIG. 9.

FIG. 10 is a flow diagram illustrating aspects of one routine 1000 disclosed herein for providing hardware inventory data via NFC, utilizing the mechanism illustrated in FIG. 9. The routine 1000 begins at operation 1002, where booting of the server computer 102 is begun. In particular, the firmware 104 begins execution. The routine 1000 then proceeds from operation 1002 to operation 1004.

At operation 1004, the firmware 104 determines if it is to generate and provide the hardware inventory data 902. For example, and without limitation, the firmware 104 might examine a configuration for the firmware 104 to determine if a setting has been set indicating that the hardware inventory data 902 is to be collected. If the hardware inventory data 902 is not to be collected, the routine 1000 proceeds to operation 1006, where the server computer 102 continues booting without collection of the hardware inventory data 902. Otherwise, the routine 1000 proceeds to operation 1008.

At operation 1008, the firmware 104 generates or collects the hardware inventory data 902. As discussed above, for example, the firmware 104 might collect the hardware inventory data 902 from an SMBIOS table containing the hardware inventory data 902. The firmware 104 might alternatively take an inventory of the hardware itself in order to generate the hardware inventory data 902. The routine 1000 then proceeds from operation 1008 to operation 1010.

At operation 1010, the firmware 104 utilizes the NFC reader 110 to store the hardware inventory data 902 on the NFC card 116. As discussed above, the server computer 102 can include a case, or enclosure, and the NFC card 116 can be affixed to the external portion of the enclosure. In this manner, an application 512 executing on an NFC-equipped mobile device 512 can be utilized to read the hardware inventory data 902 from the NFC card 116. The routine 1000 then continues from operation 1010 to operation 1006, where the server computer 102 can continue to boot. From operation 1006, the routine 1000 proceeds to operation 1012, where it ends.

Figure 11:
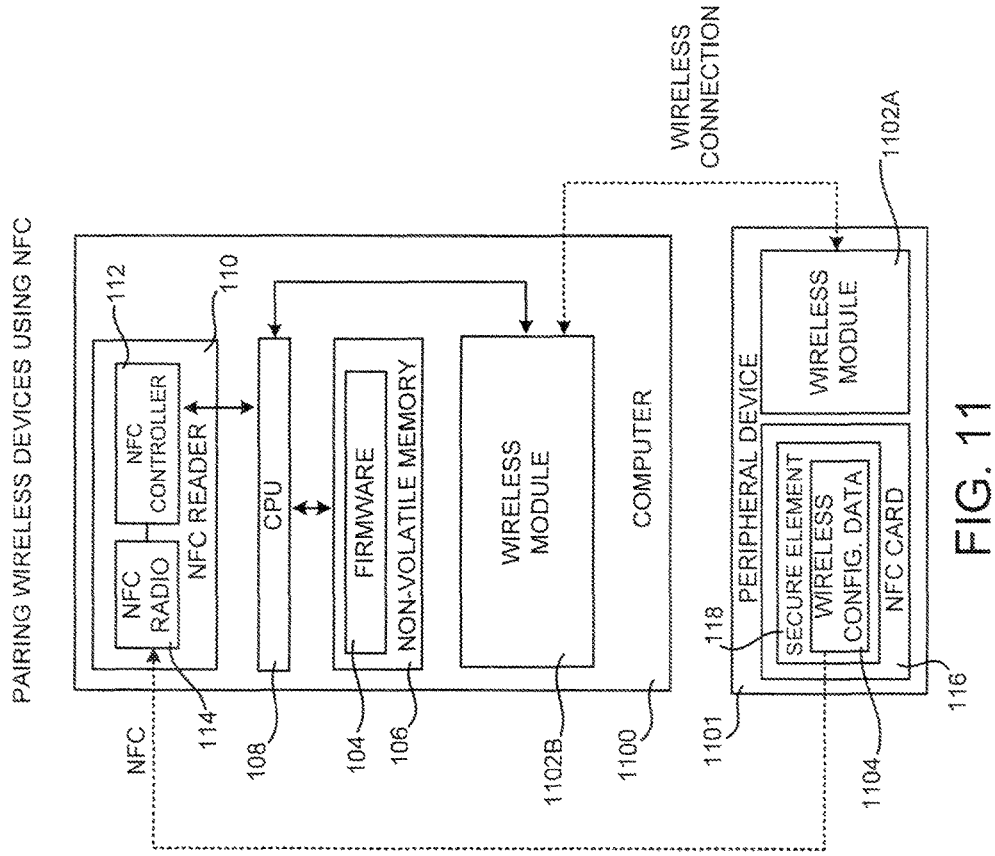
FIG. 11 is a block diagram showing aspects of a computer disclosed herein that can utilize NFC to pair hardware devices to the computer, according to one configuration.

FIG. 11 is a block diagram showing aspects of a computer 1100 disclosed herein that can utilize NFC to pair hardware devices to the computer 1100, according to one configuration. The computer can be a laptop, desktop, tablet, slate, smartphone, server, or other type of computing device configured in the manner described below. One illustrative configuration for the computer 1100 is described below with regard to FIG. 15.

In the example configuration shown in FIG. 11, the computer 1100 is equipped with a wireless module 1102B. The wireless module 1102B enables the computer 1100 to communicate with other devices over wireless connections such as, but not limited to, BLUETOOTH and WI-FI wireless connections.

In the example shown in FIG. 11, the computer 1100 is also configured to utilize the NFC reader 110 to read wireless configuration data 1104 from a secure element 118 in an NFC card 116 in a peripheral device 1101. As shown in FIG. 11, the peripheral device 1101 also includes a wireless module 1102A that can communicate with the wireless module 1102B over the wireless connection. The peripheral device 1101 can be, but is not limited to, a keyboard, mouse, wireless router, trackpad, or a wireless mobile telephone.

In some configurations, the peripheral device 1101 is an On-Board Diagnostics ("OBD")—compatible device. As known to those skilled in the art, the OBD standard specifies a type of diagnostic connector for use in automobiles and its pinout, the electrical signaling protocols available, and a messaging format. The OBD standard also provides a candidate list of vehicle parameters to monitor along with how to encode the data for each. In this configuration, the NFC-equipped computer 1100 can utilize the mechanism disclosed herein to establish a connection to the OBD-compatible device and retrieve diagnostic data from the OBD-compatible device via the firmware 104.

As discussed briefly above, the wireless configuration data 1104 includes data for configuring the NFC-equipped computer 1100 for communication with the peripheral device 1100 over a wireless connection. For example, and without limitation, the wireless configuration data 1104 can include data for configuring communication between the computer 1100 and the peripheral device 1101 over BLUETOOTH or WI-FI. As specific examples, the wireless configuration data 1104 can include a Service Set Identifier ("SSID") and/or a password for a WI-FI network. The wireless configuration data 1104 can include other types of data for configuring other types of wireless connections in other configurations.

Once the firmware 104 of the computer 1100 has retrieved the wireless configuration data 1104 via NFC, the firmware 104 of the computer 1100 can utilize the wireless configuration data 1104 to configure the wireless module 1102B for communication with the wireless module 1102A. In this manner, the computer 1100 can utilize NFC to obtain wireless configuration data 1104 for use in establishing a wireless data connection with the peripheral device 1101 without user intervention. Once a wireless connection can be established, the firmware 104 can read data, such as ODB data, from the peripheral device 1101. Additional details regarding this process will be provided below with regard to FIG. 12.

Figure 12:
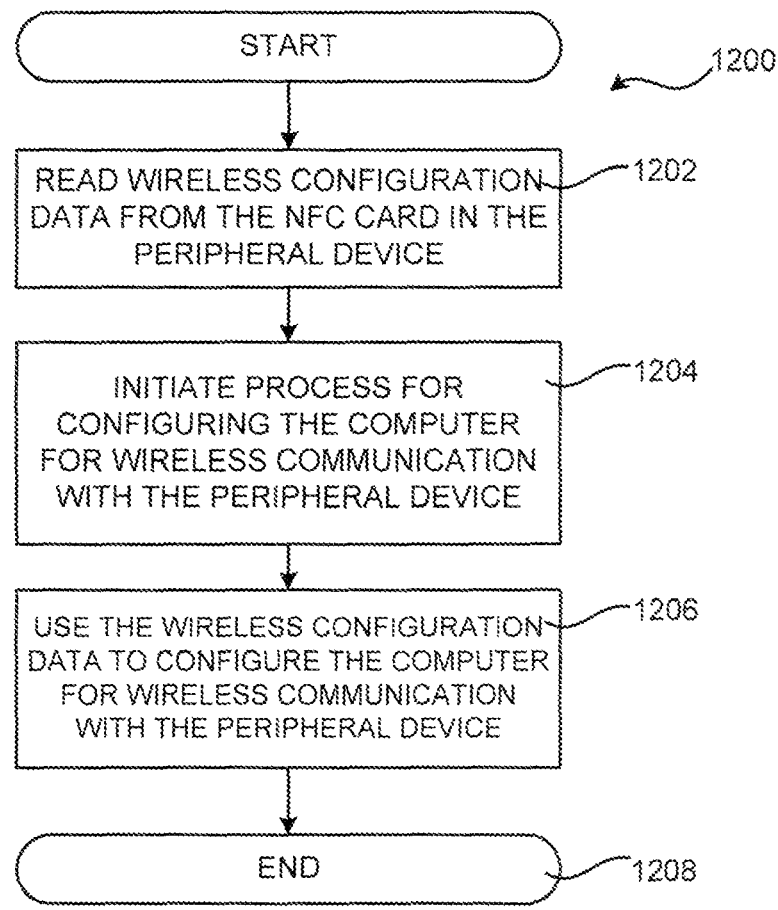
FIG. 12 is a flow diagram illustrating aspects of one method disclosed herein for pairing hardware devices to a computer using NFC, utilizing the mechanism illustrated in FIG. 11.

FIG. 12 is a flow diagram illustrating aspects of one routine 1200 disclosed herein for pairing hardware devices to a computer 1100 using NFC, utilizing the mechanism illustrated in FIG. 11. The routine 1200 begins at operation 1202, where the computer 1100 reads the wireless configuration data 1104 from the peripheral device 1101 using the NFC reader 110. In some configurations, the firmware 104 reads the wireless configuration data 1104 from the peripheral device 1101. Other software components executing on the computer 1100 can read the wireless configuration data 1104 from the peripheral device 1101 in other configurations.

From operation 1202, the routine 1200 proceeds to operation 1204, where the firmware 104 (or another component) initiates a process for configuring the wireless module 1102B for communication with the wireless module 1102A using the wireless configuration data 1104 obtained at operation 1202. The routine 1200 then proceeds from operation 1204 to operation 1206, where the firmware 104 (or another component) utilizes the wireless configuration data 1104 to configure the wireless module 1102B for communication with the wireless module 1102A over a wireless connection. Once the wireless module 1102B has been configured, a wireless connection can be established with the wireless module 1102B. The firmware 104 can then communicate with the peripheral device 1101 over the wireless connection. The routine 1200 then proceeds from operation 1206 to operation 1208, where it ends.

Figure 13:
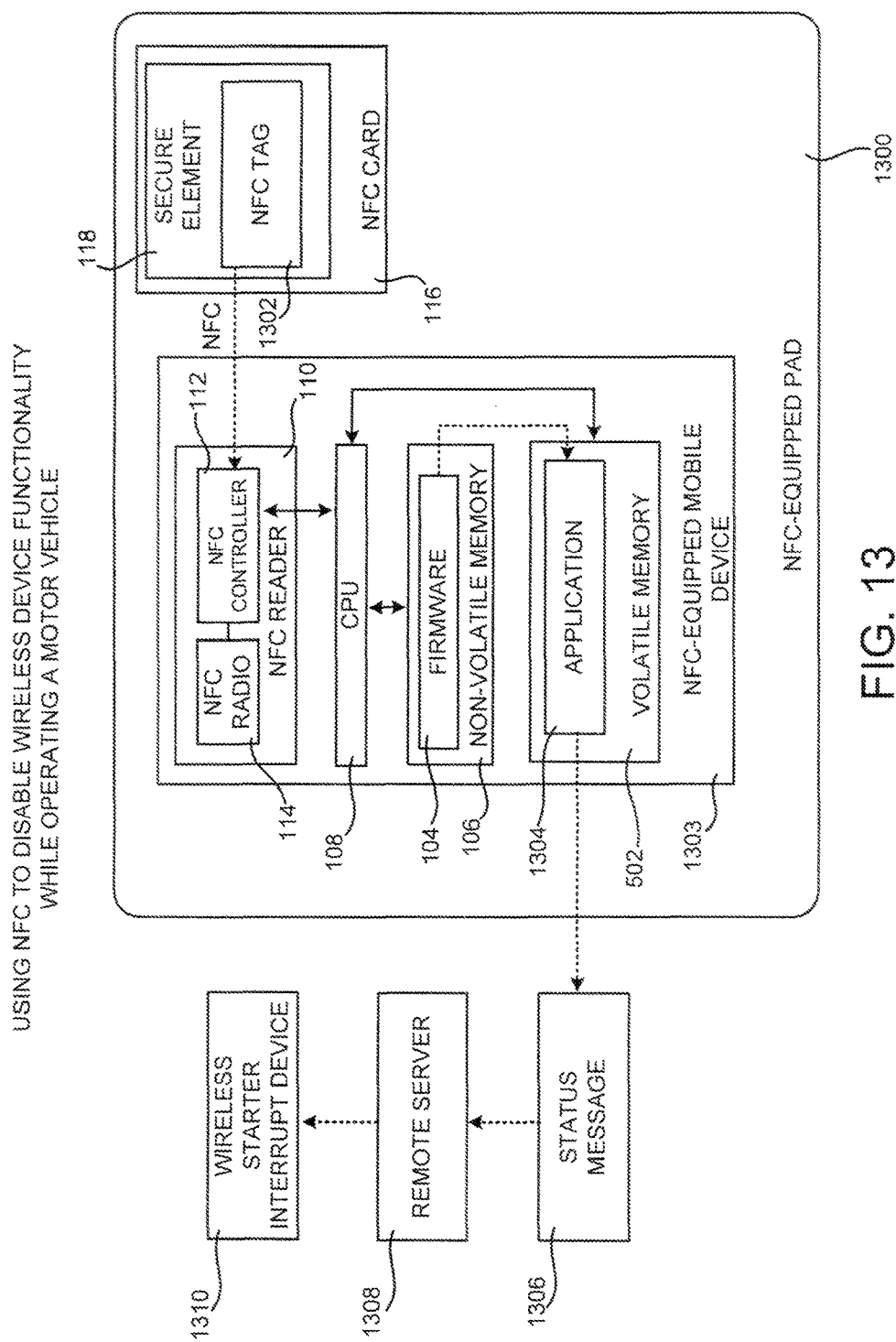
FIG. 13 is a block diagram showing aspects of a system disclosed herein that can utilize NFC to disable functionality provided by a mobile device while a user is operating a motor vehicle, according to one configuration.

FIG. 13 is a block diagram showing aspects of a system disclosed herein that can utilize NFC to disable functionality provided by a mobile device while a user is operating a motor vehicle, according to one configuration. In order to provide this functionality, an NFC-equipped pad 1300 (which might be referred to herein as "the pad 1300") is provided that has an embedded NFC card 116 storing an NFC tag 1302 in its secure element 118. The pad 1300 can be made of rubber, fabric, or another material. Preferably, the material will enable an NFC-equipped mobile device 1303 (which might be referred to herein as "the mobile device 1303") to be placed on the pad 1300 and not move while a motor vehicle containing the pad 1300 is in motion. The pad 1300 might also have straps or other elements for holding the mobile device 1303 in proximity to the pad 1300.

The pad 1300 can be created in a size suitable for placing the pad 1300 on the dashboard of a motor vehicle, and for allowing a mobile device 1303 to be placed upon its top surface. For example, the pad 1300 has dimensions slightly larger than a typical wireless mobile telephone in some configurations. The pad 1300 can also be affixed to the dashboard or other location within a motor vehicle through the use of adhesive, VELCRO, or another mechanism. The pad 1300 does not need to receive power in order to provide the functionality disclosed herein.

When an NFC-equipped mobile device 1303, such as a wireless mobile telephone, is placed on the pad 1300, and application 1304 (or another component) executing on the mobile device 1303 can read the NFC tag 1302 from the NFC card 116 in the pad 1300. If the mobile device 1303 is able to read the NFC tag 116, the application 1304 can disable one or more functions of the mobile device 1303. For example, a video display and/or user input device (e.g. keyboard, touchscreen, or buttons) of the mobile device 1303 can be disabled. Functionality for sending text messages and for making non-hands-free calls or for performing other functions on the mobile device 1303 can also be disabled. Other features of the mobile device 1303 may remain enabled, such as the ability to make wireless phone calls via BLUETOOTH. In this manner, certain features of the mobile device 1303 can be disabled while the mobile device is located on or near the pad 1300.

Additionally, if the NFC tag 1302 can be read from the NFC card 116 in the pad 1300, the application 1304 executing on the mobile device 1303 can transmit a message 1306 (e.g. using a wireless cellular network) to a remote server 1308 indicating that the mobile device 1303 is located on the pad 1300. In response to receiving such a message 1306, the server 1308 can transmit a message to a wireless starter interrupt device 1310 in the motor vehicle (not shown in FIG. 13) to enable operation of the motor vehicle. The motor vehicle cannot be started until the starter interrupt device 1310 receives such a message 1306 from the server 1308. In some configurations, the application 1304 executing on the mobile device 1303 can transmit a message directly to the wireless starter interrupt device 1310 (e.g. using BLUETOOTH or WI-FI) in the motor vehicle to enable operation of the motor vehicle.

As discussed briefly above, the wireless starter interrupt device 1310 can connect to a motor vehicle via an OBD-II port (or another suitable technology) and can include a wireless radio (e.g. for communicating on a wireless cellular network) for communicating with the remote server 1308. The wireless starter interrupt device 1310 can also be configured via NFC for direct communication with the NFC-equipped mobile device 1303 using BLUETOOTH or WI-FI using the mechanism described above with regard to FIGS. 11 and 12. The wireless starter interrupt device 1310 provides functionality for preventing a motor vehicle from being started and/or for disabling other functions of the motor vehicle. The wireless starter interrupt device 1310 can also include a global positioning system ("GPS") sensor (not shown in FIG. 13) to determine whether a motor vehicle is moving.

The application 1304 can periodically make a determination as to whether the mobile device 1303 can still read the NFC tag 1302 in the secure element 118 of the NFC card 116 in the pad 1300. If the mobile device 1303 can continue to read the NFC tag 1302, this means that the mobile device 1303 is still located on the pad 1300 and that the previously disabled functions of the mobile device 1303 should remain disabled. If the mobile device 1303 is unable to read the NFC tag 1302, this means that the mobile device 1303 has been removed from the pad 1300. Accordingly, in such a situation the application 1304 can make a determination is made as to whether the mobile device 1303 is in motion (e.g. within a moving automobile).

If the application 1304 executing on the mobile device 1303 is unable to read the NFC tag 1302 and the mobile device 1303 is in motion (e.g. in a moving motor vehicle), the application 1304 can provide an audible or visual indicator on the mobile device 1303 indicating that the mobile device 1300 should be placed back on the pad 1300. In a similar fashion, if the mobile device 1303 is unable to read the NFC tag 1302 and the mobile device 1303 is in motion (e.g. in a moving motor vehicle), the application 1304 executing on the mobile device 1303 can send a message 1306 to the server computer 1308 indicating that the mobile device 1303 is in motion (e.g. in a moving motor vehicle) but not on the pad 1300. In turn, the server 1308 can transmit a message to the wireless starter interrupt device 1310 to provide an audible indicator indicating that the mobile device 1303 should be placed back on the pad 1300.

Additionally, if the mobile device 1303 is unable to read the NFC tag 1302 and the mobile device 1303 is in motion (e.g. in a moving motor vehicle), the application 1304 executing on the mobile device 1303 can send a message to the server 1308 indicating that the mobile device 1303 is in motion. In turn, the server 1308 can transmit a message to the wireless starter interrupt device 1310 to disable one or more functions of the motor vehicle. For example, the server 1308 might instruct the wireless starter interrupt device 1310 to turn the vehicle off or disable the radio in the vehicle.

If the mobile device 1303 is not located on the pad 1300 and the mobile device 1303 is not in motion for a threshold period of time (e.g. five minutes), this means that the motor vehicle has stopped moving and that the application 1304 can enable the previously disabled functions of the mobile device 1303. Through the use of this mechanism, mobile devices 1303 can be more safely used in automobiles or other types of motor vehicles and, additionally, save battery power of the mobile device 1303 while the various functions of the mobile device 1303 are disabled in the manner described above.

Figure 14:
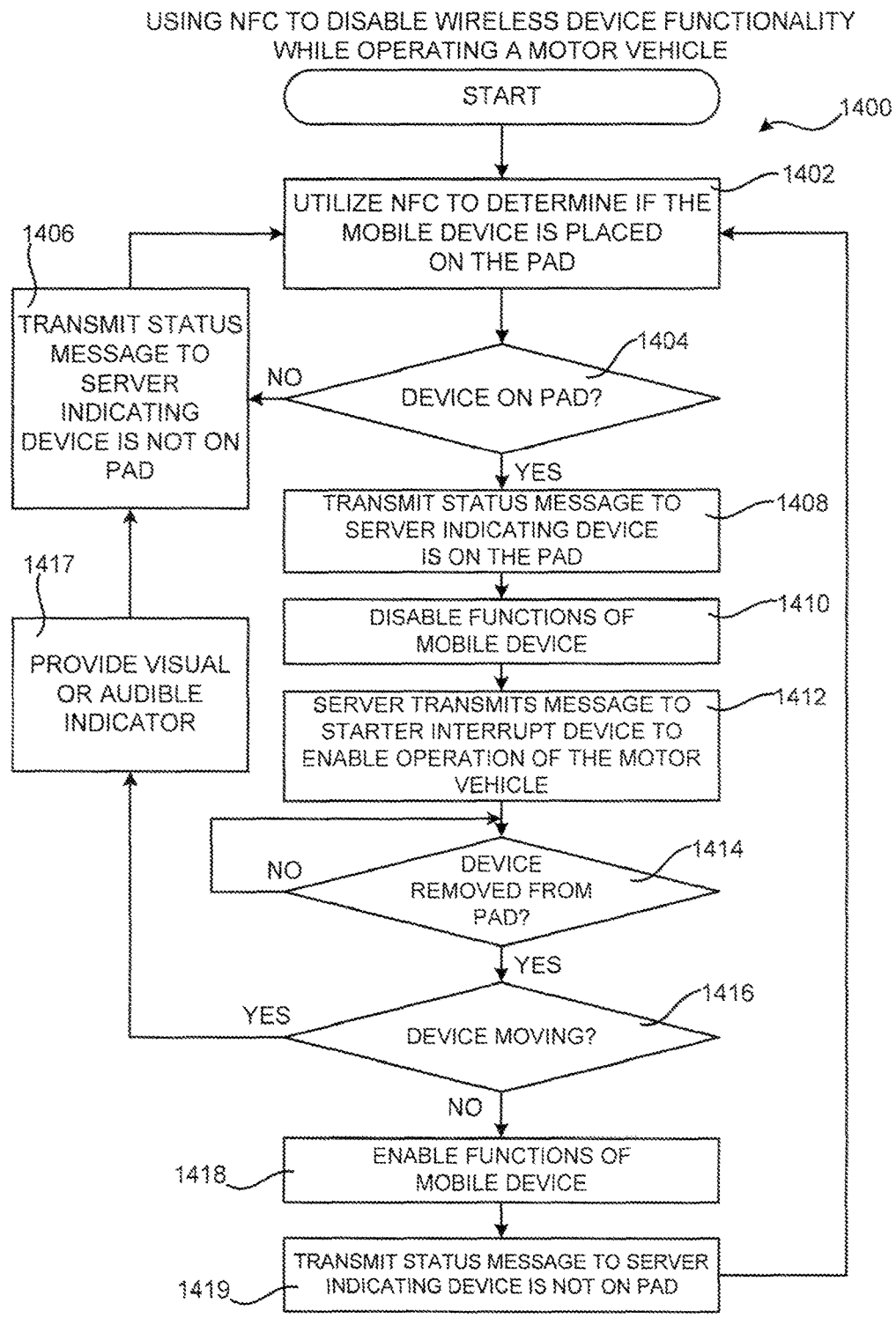
FIG. 14 is a flow diagram illustrating aspects of one method disclosed herein for utilizing NFC to disable functionality provided by a mobile device while a user of the mobile device is operating a motor vehicle, utilizing the mechanism illustrated in FIG. 13.

FIG. 14 is a flow diagram illustrating aspects of one routine 1400 disclosed herein for utilizing NFC to disable functionality provided by a mobile device 1303 while a user of the mobile device 1303 is operating a motor vehicle, utilizing the mechanism illustrated in FIG. 13. The routine 1400 begins at operation 1402, where the application 1304 executing on the mobile device can utilize the NFC reader 110 to attempt to read the NFC tag 1302 in the pad 1300. If the application 1304 can read the NFC tag 1302, this indicates that the mobile device 1303 is located on the pad 1300. If the application 1304 cannot read the NFC tag 1302, this indicates that the mobile device 1303 is not located on the pad 1300.

If the mobile device 1303 is not on the pad 1300, the routine 1400 can proceed from operation 1404 to operation 1406, where the application 1304 can cause the mobile device 1303 to transmit a message 1306 to the remote server 1308 indicating that the mobile device 1303 is not on the pad 1300. The routine 1400 then proceeds from operation 1046 to operation 1402, where another such determination can be made.

If the application 1304 determines that the mobile device 1303 is on the pad 1300, the routine 1400 proceeds from operation 1404 to operation 1408. At operation 1408, the application 1304 transmits a message 1306 to the remote server 1308 indicating that the mobile device 1303 has been placed on the pad 1300 (e.g. such as when a driver enters a motor vehicle and places the mobile device 1303 on the pad 1300). The routine 1400 then proceeds from operation 1408 to operation 1410, where the application 1304 can disable certain functions of the mobile device 1303. For example, and without limitation, the application 1304 (or another component) can disable a display screen of the mobile device 1303, a keyboard or other type of user input device of the mobile device 1303, and the ability to make non-hands-free calls on the mobile device 1303. Other functions can be disabled in other configurations. As discussed above, certain features can remain enabled, such as the ability to make hands-free calls using BLUETOOTH.

From operation 1410, the routine 1400 proceeds to operation 1412 where the server 1308 transmits a message to the wireless starter interrupt device to enable operation of the motor vehicle. In this manner, the motor vehicle can only be operated once the functions of the mobile device 1303 have been disabled. From operation 1412, the routine 1400 proceeds to operation 1414.

At operation 1414, the application 1304 again attempts to read the NFC tag 1302 in the pad 1300. If the application 1304 cannot read the NFC tag 1302, this indicates that the mobile device 1303 has been removed from the pad 1300. In this case, the routine 1400 proceeds to operation 1416, where the application 1304 determines whether the mobile device 1303 and/or the motor vehicle are moving. This can be accomplished using the GPS sensor in the wireless starter interrupt device 1310 and/or a GPS sensor in the mobile device 1303.

If the mobile device 1303 is moving (e.g. in the moving motor vehicle), this indicates that the user has removed the mobile device 1303 from the pad 1300 while the motor vehicle is moving. In this case, the routine 1400 proceeds from operation 1416 to operation 1417, where the application 1304 can cause the mobile device 1303 to provide an audible or visual indicator to the user. For instance, a sound might be played or a message can be displayed instructing the user to place the mobile device 1303 back on the pad 1300. A message 1306 can also be transmitted to the remote server 1308 indicating that the mobile device 1303 has been removed from the pad 1300 at operation 1406. In turn, the remote server 1308 can transmit a message to the wireless starter interrupt device 1310 instructing the device 1310 to provide an audible indicator that the mobile device 1303 should be placed back on the pad 1300. The message can also instruct the device 1310 to disable some functions of the motor vehicle, such as turning the motor vehicle off or disabling the sound system or climate control in the motor vehicle.

If it is determined at operation 1416 that the mobile device 1303 is not moving (e.g. the motor vehicle has been stopped), then the routine 1400 proceeds from operation 1416 to operation 1418. At operation 1418, the functions of the mobile device 1303 disabled at operation 1410 can be enabled. In some configurations, the motor vehicle must be stopped for a threshold period of time (e.g. five minutes) before the previously disabled functions of the mobile device will be enabled.

From operation 1418, the routine 1400 proceeds to operation 1419, where the application 1304 can transmit a message to the server 1308 indicating that the mobile device is no longer on the mat 1300. In turn, the server 1308 can transmit a message to the wireless starter interrupt device 1310 instructing the device to disable the ability to start the motor vehicle. The routine 1400 then proceeds back to operation 1402, where the process described above can be repeated.

Figure 15:
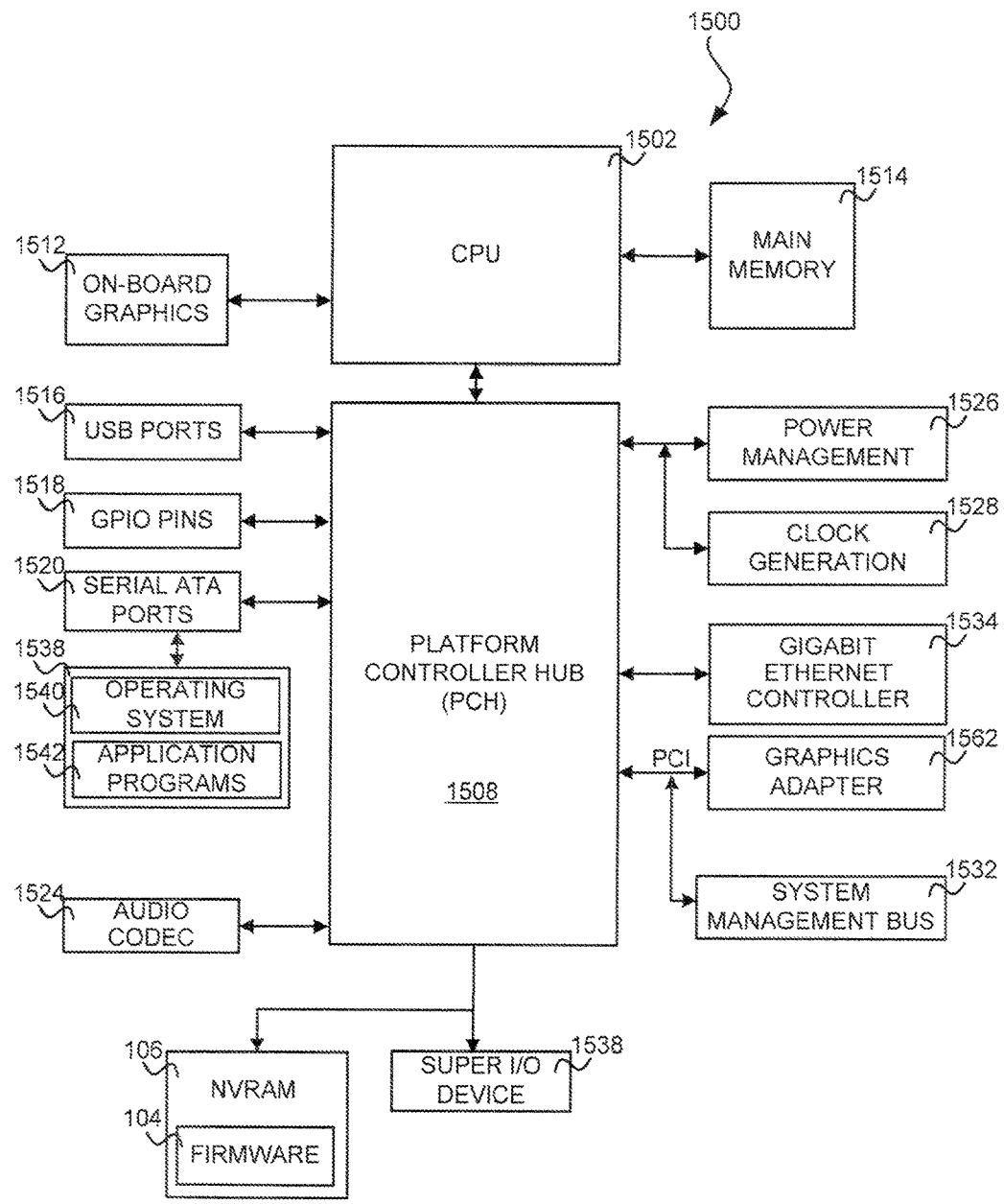
FIG. 15 is a computer architecture diagram showing a computer architecture suitable for implementing the various computer systems described herein.

Referring now to FIG. 15, an illustrative computer architecture for practicing the technologies disclosed herein for NFC-enhanced firmware security will be described. It should be appreciated that although the embodiments described herein are discussed in the context of a conventional desktop or server computer 102, the embodiments can be utilized with virtually any type of computing device that executes a firmware 104.

In particular, FIG. 15 shows aspects of an illustrative computer system 1500 that can be utilized to implement some or all of the computing devices described herein. For example, and without limitation, the computer system 1500 shown in FIG. 15 can be utilized to implement the NFC-equipped server computer 102. A computer architecture similar to that shown in FIG. 15 can also be utilized to implement the NFC-equipped mobile device 122.

The computer system 1500 shown in FIG. 15 can include a baseboard, or "motherboard," which is a printed circuit board to which a multitude of components or devices can be connected by way of a system bus or other electrical communication path. In one illustrative embodiment, a central processing unit ("CPU") 1502 operates in conjunction with a Platform Controller Hub ("PCH") 1508. The CPU 1502 can be a standard central processor that performs arithmetic and logical operations necessary for the operation of the computing system 1500. The computing system 1500 can include a multitude of CPUs 1502. Each CPU 1502 might include multiple processing cores.

The CPU 1502 provides an interface to a random access memory ("RAM") used as the main memory 1514 in the computing system 1500 and, possibly, to an on-board graphics adapter 1512. The PCH 1508 can provide an interface between the CPU 1502 and the remainder of the computing system 1500. The PCH 1508 can also be responsible for controlling many of the input/output functions of the computing system 1500. In particular, the PCH 1508 can provide one or more universal serial bus ("USB") ports 1516, an audio codec 1524, a gigabit Ethernet controller 1534, and one or more general purpose input/output ("GPIO") pins 1518. The USB ports 1516 can include USB 2.0 ports, USB 3.0 ports and USB 3.1 ports among other types of USB ports. The audio codec 1524 can include Intel High Definition Audio, Audio Codec '97 ("AC'97") and Dolby TrueHD among others. Power management circuitry 1526 and clock generation circuitry 1528 can also be utilized through the PCH 1508. An NFC reader 110, such as that described above, can be connected to the USB ports 1516 or the associated USB bus.

The PCH 1508 can also include functionality for providing networking functionality through a gigabit Ethernet controller 1534. The gigabit Ethernet controller 1534 is capable of connecting the computing system 1500 to another computing system via a network. Connections which can be made by the gigabit Ethernet controller 1534 can include LAN or WAN connections. LAN and WAN networking environments are commonplace in offices, enterprise-wide computer networks, intranets, and the Internet.

The PCH 1508 can also provide a bus for interfacing peripheral card devices such as a graphics adapter 1562. The bus can be implemented as a Peripheral Component Interconnect ("PCI") bus, a Peripheral Component Interconnect eXtended ("PCI-X") bus or a Peripheral Component Interconnect Express ("PCIe") bus among others. The PCH 1508 can also provide a system management bus 1532 for use in managing the various components of the computing system 1500.

The PCH 1508 is also configured to provide one or more interfaces for connecting mass storage devices to the computing system 1500. For instance, according to an embodiment, the PCH 1508 includes a serial advanced technology attachment ("SATA") adapter for providing one or more serial ATA ports 1520. The serial ATA ports 1520 can be connected to one or more mass storage devices storing an operating system 1540 and application programs 1542, such as the SATA disk drive 1538. As known to those skilled in the art, an operating system 1540 comprises a set of programs that control operations of a computer and allocation of resources. Application programs 1542 are programs that execute on top of the operating system 1540 software, or other runtime environment, and uses computer resources to perform application specific tasks desired by the user.

According to one embodiment of the invention, the operating system 1540 comprises the LINUX operating system. According to another embodiment of the invention the operating system 1540 comprises a version of the WINDOWS operating system from MICROSOFT CORPORATION. According to other embodiments, the operating system 1540 can comprise the UNIX or APPLE OSX operating system. It should be appreciated that other operating systems can also be utilized.

The mass storage devices connected to the PCH 1508, and their associated computer-readable storage media, provide non-volatile storage for the computing system 1500. Although the description of computer-readable storage media contained herein refers to a mass storage device, such as a hard disk or CD-ROM drive, it should be appreciated by those skilled in the art that computer-readable storage media can be any available media that can be accessed by the computing system 1500.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical disk storage, magnetic cassettes, magnetic tape, magnetic disk storage or other magnetic storage devices, or any other non-transitory medium which can be used to store the desired information and which can be accessed by the computing system 1500.

A low pin count ("LPC") interface can also be provided by the PCH 1508 for connecting a Super I/O device 1538. The Super I/O device 1538 is responsible for providing a number of input/output ports, including a keyboard port, a mouse port, a serial interface, a parallel port, and other types of input/output ports. The LPC interface can also connect a computer storage media such as a ROM or a flash memory such as a non-volatile random access memory ("NVRAM") 1536 for storing a firmware 104 that includes program code containing the basic routines that help to start up the computing system 1500 and to transfer information between elements within the computing system 1500. Some examples of firmware 104 include a BIOS firmware, an EFI-compatible firmware, or an Open Firmware, among others.

It should be appreciated that the program modules disclosed herein, including the firmware 104, can include software instructions that, when loaded into the CPU 1502 and executed, transform a general-purpose computing system into a special-purpose computing system customized to facilitate all, or part of, the operations disclosed herein. As detailed throughout this description, the program modules can provide various tools or techniques by which the computing system 1500 can participate within the overall systems or operating environments using the components, logic flows, and/or data structures discussed herein.

The CPU 1502 can be constructed from any number of transistors or other circuit elements, which can individually or collectively assume any number of states. More specifically, the CPU 1502 can operate as a state machine or finite-state machine. Such a machine can be transformed to a second machine, or a specific machine, by loading executable instructions contained within the program modules. These computer-executable instructions can transform the CPU 1502 by specifying how the CPU 1502 transitions between states, thereby transforming the transistors or other circuit elements constituting the CPU 1502 from a first machine to a second machine, wherein the second machine can be specifically configured to perform the operations disclosed herein. The states of either machine can also be transformed by receiving input from one or more user input devices, network interfaces (such as the gigabit Ethernet controller 1534), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media; whether the storage media are characterized as primary or secondary storage; and the like. For example, if the storage media are implemented as semiconductor-based memory, the program modules can transform the physical state of the semiconductor memory when the software or firmware 104 is encoded therein. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the computing system 1500 can comprise other types of computing devices, including hand-held computers, embedded computer systems, mobile devices like smartphones and tablet computing devices, and other types of computing devices known to those skilled in the art. It is also contemplated that the computing system 1500 might not include all of the components shown in FIG. 15, can include other components that are not explicitly shown in FIG. 15, or can utilize an architecture completely different than that shown in FIG. 15. For example, the computer system 1500 might include one or more radios for communicating over a wireless cellular communications network, one or more radios for other types of near field communication (e.g. BLUETOOTH), and/or other components not shown in FIG. 15.

Based on the foregoing, it should be appreciated that technologies for improving the security, performance, and configuration of server computers using NFC have been provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The disclosure herein also encompasses the subject matter set forth in the following clauses:

Clause 1. A computer-implemented method for powering on an NFC-equipped server computer utilizing near field communications (NFC), the method comprising:
reading credentials at the NFC-equipped server computer from an NFC card or an NFC-equipped mobile device via a NFC reader;
providing the credentials from the NFC reader to an embedded controller (EC) operating in the NFC-equipped server computer;
determining, by way of the EC, whether the credentials indicate a right to power on the NFC-equipped server computer; and
responsive to determining that the credentials indicate a right to power on the NFC-equipped server computer, providing a power on signal from the EC to a power controller operating in the NFC-equipped server computer in order to power on the NFC-equipped server computer.

Clause 2. The computer-implemented method of clause 1, wherein the EC comprises a non-volatile memory and wherein determining whether the credentials indicate a right to power on the NFC-equipped server computer comprises comparing the credentials read via the NFC reader to credentials previously stored in the non-volatile memory.

Clause 3. The computer-implemented method of clause 2, wherein the credentials previously stored in the non-volatile memory are defined by way of a setup program provided by the EC.

Clause 4. The computer-implemented method of clause 2, wherein the credentials previously stored in the non-volatile memory are defined by way of a setup program provided by a firmware operating in the NFC-equipped server computer.

Clause 5. A server computer, comprising:
a near-field communications (NFC) reader;
a power controller; and
an embedded controller (EC) coupled to the NFC reader, the EC configured to:
receive credentials from the NFC reader;
determine whether the credentials indicate a right to power on the server computer; and
responsive to determining that the credentials indicate a right to power on the server computer, provide a power on signal from the EC to the power controller, whereby the power controller powers on the server computer in response to receiving the power on signal.

Clause 6. The server computer of clause 5, wherein the EC comprises a non-volatile memory, and wherein determine whether the credentials indicate a right to power on the NFC-equipped server computer comprises comparing the credentials received from the NFC reader to credentials previously stored in the non-volatile memory.

Clause 7. The server computer of clause 6, wherein the credentials previously stored in the non-volatile memory are defined by way of a setup program provided by the EC.

Clause 8. The server computer of clause 6, wherein the server computer further comprises a firmware, and wherein the credentials previously stored in the non-volatile memory are defined by way of a setup program provided by the firmware.

Clause 9. A non-transitory computer-readable storage medium having instructions stored thereupon which, when executed by a processor, cause the processor to:
read credentials at an NFC-equipped server computer from an NFC card or an NFC-equipped mobile device via a NFC reader;
provide the credentials from the NFC reader to an embedded controller (EC) operating in the NFC-equipped server computer;
determine, by way of the EC, whether the credentials indicate a right to power on the NFC-equipped server computer; and
responsive to determining that the credentials indicate a right to power on the NFC-equipped server computer, provide a power on signal from the EC to a power controller operating in the NFC-equipped server computer in order to power on the NFC-equipped server computer.

Clause 10. The non-transitory computer-readable storage medium of clause 9, wherein the EC comprises a non-volatile memory, and wherein determining whether the credentials indicate a right to power on the NFC-equipped server computer comprises comparing the credentials read via the NFC reader to credentials previously stored in the non-volatile memory.

Clause 11. The non-transitory computer-readable storage medium of clause 10, wherein the credentials previously stored in the non-volatile memory are defined by way of a setup program provided by the EC.

Clause 12. The non-transitory computer-readable storage medium of clause 10, wherein the credentials previously stored in the non-volatile memory are defined by way of a setup program provided by a firmware operating in the NFC-equipped server computer.

Clause 13. A computer-implemented method for utilizing near field communication (NFC) to log into an operating system executing on an NFC-equipped server computer, the method comprising:

receiving credentials from an NFC reader in the NFC-equipped server computer;

providing the credentials from the NFC reader to a firmware executing in the NFC-equipped server computer;

executing an operating system on the NFC-equipped server computer; and providing the credentials from the firmware to a driver executing on the operating system, whereby the driver is configured to utilize the credentials to log a user into the operating system.

Clause 14. The computer-implemented method of clause 13, wherein the firmware comprises a Unified Extensible Firmware Interface (UEFI) Specification—compliant firmware, and wherein a UEFI Protocol is configured to receive the credentials from the NFC reader and to provide the credentials to the driver executing on the operating system.

Clause 15. The computer-implemented method of clause 13, further comprising:

receiving user input from a keyboard connected to the NFC-equipped server computer; and utilizing the credentials and the user input to log the user into the operating system.

Clause 16. A server computer, comprising:

one or more processors;

a near field communication (NFC) reader;

a mass storage device storing an operating system; and a non-volatile memory storing a firmware, the firmware comprising instructions which, when executed on the one or more processors, cause the server computer to:

receive credentials from the NFC reader;

provide the credentials from the NFC reader to the firmware; and provide the credentials from the firmware to a driver executing on the operating system, whereby the driver is configured to utilize the credentials to log a user into the operating system.

Clause 17. The server computer of clause 16, wherein the firmware comprises a Unified Extensible Firmware Interface (UEFI) Specification—compliant firmware, and wherein a UEFI Protocol is configured to receive the credentials from the NFC reader and to provide the credentials to the driver executing on the operating system.

Clause 18. The server computer of clause 16, wherein the firmware comprises further instructions to:

receive user input from a keyboard connected to the server computer; and utilize the credentials and the user input to log the user into the operating system.

Clause 19. A non-transitory computer-readable storage medium having instructions stored thereupon which, when executed by a processor, cause the processor to:

receive credentials from a near field communication (NFC) reader;

provide the credentials to a firmware; and provide the credentials from the firmware to a driver executing on an operating system, whereby the driver is configured to utilize the credentials to log a user into the operating system.

Clause 20. The non-transitory computer-readable storage medium of clause 19, wherein the firmware comprises a Unified Extensible Firmware Interface (UEFI) Specification-compliant firmware, and wherein a UEFI Protocol is configured to receive the credentials from the NFC reader and to provide the credentials to the driver executing on the operating system.

Clause 21. The non-transitory computer-readable storage medium of clause 19, comprising further instructions to:

receive user input from a keyboard; and utilize the credentials and the user input to log the user into the operating system.

Clause 22. A computer-implemented method for streaming firmware debugging data to a near field communication ("NFC") equipped mobile device, the method comprising:

executing a firmware on a server computer equipped with an NFC reader;

establishing an NFC connection between the NFC reader and an NFC-equipped mobile device;

generating, by way of the firmware, firmware debugging data describing aspects of the execution of the firmware; and streaming the firmware debugging data from the server computer to the NFC-equipped mobile device via the NFC connection.

Clause 23. The computer-implemented method of clause 22, wherein the firmware debugging data comprises system health information.

Clause 24. The computer-implemented method of clause 22, wherein the firmware debugging data comprises one or more checkpoints.

Clause 25. The computer-implemented method of clause 22, wherein the firmware debugging data comprises one or more debugging logs.

Clause 26. A server computer, comprising:

one or more processors;

a near field communication (NFC) reader; and a non-volatile memory storing a firmware executable on the one or more processors and configured to:

cause an NFC connection to be established between the NFC reader and an NFC-equipped mobile device;

generate firmware debugging data describing aspects of the execution of the firmware; and stream the firmware debugging data to the NFC-equipped mobile device via the NFC connection.

Clause 27. The server computer of clause 26, wherein the firmware debugging data comprises system health information.

Clause 28. The server computer of clause 26, wherein the firmware debugging data comprises one or more checkpoints.

Clause 29. The server computer of clause 26, wherein the firmware debugging data comprises one or more debugging logs.

Clause 30. A non-transitory computer-readable storage medium having instructions stored thereupon which, when executed by a processor, cause the processor to:

cause an NFC connection to be established between a near field communication (NFC) reader and an NFC-equipped mobile device;

generate firmware debugging data describing aspects of the execution of the firmware; and stream the firmware debugging data to the NFC-equipped mobile device via the NFC connection.

Clause 31. The non-transitory computer-readable storage medium of clause 30, wherein the firmware debugging data comprises system health information.

Clause 32. The non-transitory computer-readable storage medium of clause 30, wherein the firmware debugging data comprises one or more checkpoints.

Clause 33. The non-transitory computer-readable storage medium of clause 30, wherein the firmware debugging data comprises one or more debugging logs.

Clause 34. A computer-implemented method for initiating a firmware update or recover at an NFC-equipped server computer, the method comprising:
  utilizing an NFC reader in the NFC-equipped server computer to read an NFC tag;
  determining whether the NFC tag indicates that an update or recovery of a firmware of the NFC-equipped server computer is to be performed;
  responsive to determining that the NFC tag indicates that an update or recovery of a firmware of the NFC-equipped server computer is to be performed, causing an update application to be executed from an external mass storage device for updating the firmware of the NFC-equipped server computer from a firmware image; and
  responsive to determining that the NFC tag indicates that an update or recovery of a firmware of the NFC-equipped server computer is not to be performed, preventing the update application from being executed on the NFC-equipped server computer.

Clause 35. The computer-implemented method of clause 34, wherein the firmware image is stored on the external mass storage device.

Clause 36. The computer-implemented method of clause 34, wherein the NFC tag is stored on an NFC card or an NFC-equipped mobile device, and wherein the firmware image is stored on the NFC card or NFC-equipped mobile device.

Clause 37. The computer-implemented method of clause 34, further comprising:
  responsive to determining that the NFC tag indicates that an update or recovery of a firmware of the NFC-equipped server computer is to be performed, causing the NFC-equipped server computer to reboot prior to causing the update application to be executed.

Clause 38. A server computer, comprising:
  one or more processors;
  a near field communication (NFC) reader; and
  a non-volatile storage device storing a firmware, the firmware configured to:
    utilize the NFC reader in to read an NFC tag;
    determine whether the NFC tag indicates that an update or recovery of the firmware is to be performed; and
    in response to determining that the NFC tag indicates that an update or recovery of the firmware is to be performed, cause an update application to be executed from an external mass storage device for updating the firmware of the server computer from a firmware image.

Clause 39. The server computer of clause 38, wherein the firmware image is stored on the external mass storage device.

Clause 40. The server computer of clause 38, wherein the NFC tag is stored on an NFC card or an NFC-equipped mobile device, and wherein the firmware image is stored on the NFC card or NFC-equipped mobile device.

Clause 41. The server computer of clause 38, wherein the firmware is further configured to prevent the update application from being executed on the server computer in response to determining that the NFC tag indicates that an update or recovery of a firmware of the NFC-equipped server computer is not to be performed.

Clause 42. A non-transitory computer-readable storage medium having instructions stored thereupon which, when executed by a processor, cause the processor to:
  utilize a near field communication (NFC) reader in a NFC-equipped server computer to read an NFC tag;
  determine whether the NFC tag indicates that an update or recovery of a firmware of the NFC-equipped server computer is to be performed; and
  responsive to determining that the NFC tag indicates that an update or recovery of a firmware of the NFC-equipped server computer is to be performed, cause an update application to be executed from a mass storage device external to the NFC-equipped server computer for updating the firmware of the NFC-equipped server computer from a firmware image.

Clause 43. The non-transitory computer-readable storage medium of clause 42, wherein the firmware image is stored on the external mass storage device.

Clause 44. The non-transitory computer-readable storage medium of clause 42, wherein the NFC tag is stored on an NFC card or an NFC-equipped mobile device, and wherein the firmware image is stored on the NFC card or NFC-equipped mobile device.

Clause 45. The non-transitory computer-readable storage medium of clause 42, having further instructions stored thereon to prevent the update application from being executed on the NFC-equipped server computer in response to determining that the NFC tag indicates that an update or recovery of a firmware of the NFC-equipped server computer is not to be performed.

Clause 46. A computer-implemented method for providing hardware inventory data for a near field communication (NFC)-equipped server computer, the method comprising:
  executing a firmware of the NFC-equipped server computer;
  collecting, by way of the firmware, hardware inventory data, the hardware inventory data comprising data describing one or more hardware components of the NFC-equipped server computer; and
  utilizing an NFC reader in the NFC-equipped server computer to cause the hardware inventory data to be stored on an NFC card.

Clause 47. The computer-implemented method of clause 46, wherein the hardware inventory data is collected from a System Management BIOS (SMBIOS) table.

Clause 48. The computer-implemented method of clause 46, wherein the NFC card is affixed to a case of the NFC-equipped server computer.

Clause 49. A server computer, comprising:
  one or more processors;
  a near field communication (NFC) reader; and
  a non-volatile storage device storing a firmware, the firmware configured to:
    collect hardware inventory data, the hardware inventory data comprising data describing one or more hardware components of the server computer; and
    utilize the an NFC reader to store the hardware inventory data on an NFC card.

Clause 50. The server computer of clause 49, wherein the hardware inventory data is collected from a System Management BIOS (SMBIOS) table.

Clause 51. The server computer of clause 49, wherein the server computer further comprises a case, and wherein the NFC card is affixed to the case of the NFC-equipped server computer.

Clause 52. A non-transitory computer-readable storage medium having instructions stored thereupon which, when executed by a processor, cause the processor to:
  execute a firmware of a near field communication (NFC)-equipped server computer;

collect, by way of the firmware, hardware inventory data, the hardware inventory data comprising data describing one or more hardware components of the NFC-equipped server computer; and utilize an NFC reader in the NFC-equipped server computer to cause the hardware inventory data to be stored on an NFC card.

Clause 53. The non-transitory computer-readable storage medium of clause 52, wherein the hardware inventory data is collected from a System Management BIOS (SMBIOS) table.

Clause 54. The non-transitory computer-readable storage medium of clause 52, wherein the server computer further comprises a case, and wherein the NFC card is affixed to the case of the NFC-equipped server computer.

Clause 55. A computer-implemented method for configuring a near field communication (NFC)—equipped computer for wireless configuration with a peripheral device, the method comprising:

executing a firmware in the NFC-equipped computer;

utilizing, by way of the firmware, an NFC reader in the NFC-equipped computer to read wireless configuration data from a secure element of an NFC card in the peripheral device; and configuring, by way of the firmware, a wireless connection between the NFC-equipped computer and the peripheral device using the wireless configuration data.

Clause 56. The computer-implemented method of clause 55, wherein the wireless connection comprises a BLUETOOTH connection Clause 57. The computer-implemented method of clause 55, wherein the wireless connection comprises a WI-FI connection.

Clause 58. The computer-implemented method of clause 55, wherein the peripheral device comprises an On-Board Diagnostics (OBD) device.

Clause 59. A computer, comprising:
one or more processors;
a near field communication (NFC) reader;
a wireless module; and
at least one non-transitory computer-readable storage medium having instructions stored thereupon which, when executed by the one or more processors, cause the server computer to:
utilize the NFC reader of the computer to read wireless configuration data from a secure element of an NFC card in a peripheral device; and
configure the wireless module for communication with the peripheral device over a wireless connection using the wireless configuration data.

Clause 60. The server computer of clause 59, wherein the peripheral device comprises a keyboard.

Clause 61. The server computer of clause 59, wherein the peripheral device comprises a mouse.

Clause 62. The server computer of clause 59, wherein the peripheral device comprises an On-Board Diagnostics (OBD) device.

Clause 63. A non-transitory computer-readable storage medium having instructions stored thereupon which, when executed by a processor, cause a processor to:
utilize a near field communication (NFC) reader to read wireless configuration data from a secure element of an NFC card in a peripheral device; and
use the wireless configuration data to configure a wireless module for wireless communication with the peripheral device over a wireless connection.

Clause 64. The non-transitory computer-readable storage medium of clause 63, wherein the peripheral device comprises a router.

Clause 65. The non-transitory computer-readable storage medium of clause 63, wherein the wireless connection comprises a BLUETOOTH or WI-FI connection.

Clause 66. The non-transitory computer-readable storage medium of clause 63, wherein the peripheral device comprises an On-Board Diagnostics (OBD) device.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A computer-implemented method for powering on a near-field communications (NFC)-equipped server computer utilizing NFC, the method comprising:
reading user credentials at the NFC-equipped server computer from an NFC card or an NFC-equipped mobile device via an NFC reader powered on by a direct-current (DC) power supply device;
providing the user credentials from the NFC reader to an embedded controller (EC) operating in the NFC-equipped server computer, the EC powered on by the DC power supply device and the NFC-equipped server computer having defined components powered off;
determining, by way of the EC, whether the user credentials indicate a right to power on the NFC-equipped server computer; and
responsive to determining that the user credentials indicate the right to power on the NFC-equipped server computer, providing a power-on signal from the EC to a power controller operating in the NFC-equipped server computer, the power-on signal causing the DC power supply device to power on the defined components of the NFC-equipped server computer.

2. The computer-implemented method of claim 1, wherein the EC comprises a non-volatile memory and wherein determining whether the user credentials indicate the right to power on the NFC-equipped server computer comprises comparing the user credentials read via the NFC reader to user credentials previously stored in the non-volatile memory.

3. The computer-implemented method of claim 2, wherein the user credentials previously stored in the non-volatile memory are defined by way of a setup program provided by the EC.

4. The computer-implemented method of claim 2, wherein the user credentials previously stored in the non-volatile memory are defined by way of a setup program provided by a firmware operating in the NFC-equipped server computer.

5. A server computer, comprising:
a near-field communications (NFC) reader powered on by a direct-current (DC) power supply device;
a power controller; and
an embedded controller (EC) coupled to the NFC reader and powered on by the DC power supply device, the EC configured to:
receive user credentials from the NFC reader;

determine whether the user credentials indicate a right to power on the server computer, the server computer operating in a mode having defined components powered off; and responsive to determining that the user credentials indicate the right to power on the server computer, provide a power-on signal to the power controller;

wherein the power controller causes the DC power supply device to power on the defined components in response to receiving the power-on signal.

6. The server computer of claim 5, wherein the EC comprises a non-volatile memory, and wherein to determine whether the user credentials indicate the right to power on the NFC-equipped server computer, the EC is further configured to compare the user credentials received from the NFC reader to user credentials previously stored in the non-volatile memory.

7. The server computer of claim 6, wherein the user credentials previously stored in the non-volatile memory are defined by way of a setup program provided by the EC.

8. The server computer of claim 6, wherein the server computer further comprises a firmware, and wherein the user credentials previously stored in the non-volatile memory are defined by way of a setup program provided by the firmware.

9. A non-transitory computer-readable storage medium having instructions stored thereupon which, when executed by a processor, cause the processor to:

read user credentials at a near-field communications (NFC-equipped server computer from an NFC card or an NFC-equipped mobile device via an NFC reader powered on by a direct-current (DC) power supply device;

provide the user credentials from the NFC reader to an embedded controller (EC) operating in the NFC-equipped server computer, the EC powered on by the DC power supply device and the NFC-equipped server computer having defined components powered off;

determine, by way of the EC, whether the user credentials indicate a right to power on the NFC-equipped server computer; and responsive to determining that the user credentials indicate the right to power on the NFC-equipped server computer, provide a power-on signal from the EC to a power controller operating in the NFC-equipped server computer, the power-on signal causes the DC power supply device to power on the defined components.

10. The non-transitory computer-readable storage medium of claim 9, wherein the EC comprises a non-volatile memory, and wherein to determine whether the user credentials indicate the right to power on the NFC-equipped server computer, the instructions, when executed by the processor, cause the processor to compare the user credentials read via the NFC reader to user credentials previously stored in the non-volatile memory.

11. The non-transitory computer-readable storage medium of claim 10, wherein the user credentials previously stored in the non-volatile memory are defined by way of a setup program provided by the EC.

12. The non-transitory computer-readable storage medium of claim 10, wherein the user credentials previously stored in the non-volatile memory are defined by way of a setup program provided by a firmware operating in the NFC-equipped server computer.

* * * * *

UNITED STATES PATENT AND TRADEMARK OFFICE
CERTIFICATE OF CORRECTION

| | | |
|---|---|---|
| PATENT NO. | : 10,219,135 B1 | Page 1 of 2 |
| APPLICATION NO. | : 15/462332 | |
| DATED | : February 26, 2019 | |
| INVENTOR(S) | : Kai Yau | |

It is certified that error appears in the above-identified patent and that said Letters Patent is hereby corrected as shown below:

In the Claims

Column 29, Lines 26-33 and Column 30, Lines 1-14, (Claim 9) delete:
"9. A non-transitory computer-readable storage medium having instructions stored thereupon which, when executed by a processor, cause the processor to:
 read user credentials at a near-field communications (NFC-equipped server computer from an NFC card or an NFC-equipped mobile device via an NFC reader powered on by a direct-current (DC) power supply device;
 provide the user credentials from the NFC reader to an embedded controller (EC) operating in the NFC-equipped server computer, the EC powered on by the DC power supply device and the NFC-equipped server computer having defined components powered off;
 determine, by way of the EC, whether the user credentials indicate a right to power on the NFC-equipped server computer; and
 responsive to determining that the user credentials indicate [[a]]the right to power on the NFC-equipped server computer, provide a power-on signal from the EC to a power controller operating in the NFC-equipped server computer, the power-on signal causes the DC power supply device to power on the defined components."

And insert:
--9. A non-transitory computer-readable storage medium having instructions stored thereupon which, when executed by a processor, cause the processor to:
 read user credentials at a near-field communications (NFC)-equipped server computer from an NFC card or an NFC-equipped mobile device via an NFC reader powered on by a direct-current (DC) power supply device;
 provide the user credentials from the NFC reader to an embedded controller (EC) operating in the NFC-equipped server computer, the EC powered on by the DC power supply device and the NFC-equipped server computer having defined components powered off;
 determine, by way of the EC, whether the user credentials indicate a right to power on the NFC-equipped server computer; and
 responsive to determining that the user credentials indicate [[a]]the right to power on the Signed and Sealed this
Twenty-third Day of April, 2019

Andrei Iancu
*Director of the United States Patent and Trademark Office*

NFC-equipped server computer, provide a power-on signal from the EC to a power controller operating in the NFC-equipped server computer, the power-on signal causes the DC power supply device to power on the defined components.--